United States Patent
Munns et al.

(10) Patent No.: US 9,646,179 B1
(45) Date of Patent: *May 9, 2017

(54) MECHANICAL LOCKING DEVICE FOR COMPUTER PORTS AND PORTABLE STORAGE DEVICES

(71) Applicant: Foxrun Development Co., LLC, North Hudson, NY (US)

(72) Inventors: Clifford B. Munns, Gastonia, NC (US); Nancy Ferguson-Guttenberg, Santa Fe, NM (US)

(73) Assignee: Foxrun Development Co., LLC, North Hudson, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,389

(22) Filed: Dec. 30, 2016

(51) Int. Cl.
*G06F 21/00* (2013.01)
*G06F 21/83* (2013.01)
*E05B 47/00* (2006.01)

(52) U.S. Cl.
CPC .......... *G06F 21/83* (2013.01); *E05B 47/0009* (2013.01)

(58) Field of Classification Search
CPC ....................................................... G06F 21/83
USPC ..................................................... 726/34, 35
See application file for complete search history.

(56) References Cited

U.S. PATENT DOCUMENTS

| 9,460,319 | B1 | 10/2016 | Munns et al. |
| 2007/0132551 | A1* | 6/2007 | Mozer ................. E05B 47/0009 340/5.52 |
| 2008/0041125 | A1 | 2/2008 | Poppe |
| 2015/0020189 | A1* | 1/2015 | Soffer ..................... G06F 21/85 726/16 |
| 2016/0012258 | A1 | 1/2016 | Fowler et al. |
| 2016/0012259 | A1 | 1/2016 | Fowler et al. |
| 2016/0012260 | A1 | 1/2016 | Fowler et al. |

FOREIGN PATENT DOCUMENTS

WO    2013042108 A1    3/2013

* cited by examiner

*Primary Examiner* — Longbit Chai
(74) *Attorney, Agent, or Firm* — Jeffrey D. Myers; Peacock Myers, P.C.

(57) ABSTRACT

The present invention is directed to a mechanical locking device for securing computer Input/Output (I/O) ports that are in use and for securing unused computer I/O ports of an electronic device. The invention is also directed to a mechanical locking device which can be used to secure a portable locking flash memory device in a computer I/O port. The invention is also directed to physically blocking access to a computer I/O port. The mechanical locking device includes a locking mechanism configured for releasably locking the device within the computer I/O port. The mechanical locking device further includes a first actuator configured to move the locking mechanism between a locked condition and an unlocked condition, and a second actuator configured to prevent the locking mechanism from moving to the unlocked condition.

20 Claims, 23 Drawing Sheets

MECHANICAL LOCKING DEVICE FOR COMPUTER PORTS AND PORTABLE STORAGE DEVICES

FIELD OF THE INVENTION

The present invention relates to devices and methods that enhance computer and network security by physically blocking unused and unmonitored computer ports of an electronic device and by physically locking portable storage devices which can be inserted into computer ports.

BACKGROUND OF THE INVENTION AND RELATED ART

Most modern computers and servers include at least one, and typically, multiple Input-Output (I/O ports). I/O ports are used to connect peripheral devices such as a mouse, keyboards, scanners, digital cameras, printers, external displays, external storage devices and the like, for power supply and/or data transfer purposes. Unauthorized connections to a computer network through I/O ports can result in unauthorized access and theft of network information, or insertion of viruses and malware into the host computer and the network. Typically, computers, servers, printers and other devices are supplied with multiple I/O ports. These I/O ports are often unused and/or unmonitored, making them susceptible to unauthorized access and unauthorized data transfer.

U.S. Patent Application Publication No. 2016/0012260 A1, "SYSTEM AND METHOD FOR SECURING A COMPUTER PORT USING SHAPE MEMORY ALLOYS," U.S. Patent Application Publication No. 2016/0012259 A1, "SYSTEM AND METHOD FOR SECURING A COMPUTER PORT WITH AN ATTACHED DEVICE USING SHAPE MEMORY ALLOYS," and U.S. Patent Application Publication No. 2016/0012258 A1, "SYSTEM AND METHOD FOR SECURING AN INPUT/OUTPUT PORT USING SHAPE MEMORY ALLOYS IN A LOCKING MECHANISM," disclose I/O port security devices for USB, Ethernet (RJ-45) and serial ports. These I/O security devices utilize a mechanical leaf spring plate which contains locking teeth to physically lock the security devices into the I/O port. Insertion of the security devices physically blocks access to the I/O ports. The security devices can be removed from the I/O ports by physically disengaging the leaf spring plate and locking teeth, using shape memory wire. The unlocking function is controlled using an authentication circuit.

U.S. Patent Application Publication No. 2008/0041125 A1, "USB PORT LOCKING AND BLOCKING DEVICE," discloses a mechanical lock for USB ports. Insertion of the lock into the USB port physically blocks the USB port. The device is removed manually through use of a key.

U.S. Patent Application Publication No. 2007/0132551 A1, "OPERATION AND CONTROL OF MECHANICAL DEVICES USING SHAPE MEMORY MATERIALS AND BIOMETRIC INFORMATION," discloses various mechanical locking devices which utilize shape memory wire. Further, some of the devices are controlled using authentication techniques, such as biometric recognition.

U.S. Patent Application Publication No. 2015/0020189 A1, "ELECTRO-MECHANIC USB LOCKING DEVICE," discloses a USB I/O security device which utilizes a mechanical locking tab to physically lock the security device into the I/O port. Insertion of the security device physically blocks access to the I/O port. The security device can be removed from the I/O port by physically disengaging the locking tab, using an electrical solenoid and manual push button. The unlocking function is controlled using an authentication circuit.

PCT Application Publication No. WO2013042108 A1, "SECURITY PLUG FOR PREVENTING ACCESS TO A USB SOCKET AND SECURED USB DEVICE," discloses a security plug for preventing access to a USB I/O port which is adapted to create an electrical security monitoring circuit when inserted into the USB I/O port. Unauthorized removal of the plug from the I/O port physically breaks the circuit which is detected by the host computer via application software residing on the host computer.

U.S. Pat. No. 9,460,319 B1, "DEVICE FOR SECURING A COMPUTER PORT," discloses I/O port security devices for USB, Ethernet (RJ-45) and serial ports. These I/O security devices utilize mechanical locking tabs to physically lock the security devices into the I/O port. Insertion of the security devices physically blocks access to the I/O ports. The security devices can be removed from the I/O ports by disengaging the locking tabs, using either an electrical solenoid, an electrical stepper motor or a piezo electric motor. The unlocking function is controlled using an authentication circuit.

Other I/O port mechanical locks are widely available from companies such as Lindy Computer Connection Technology, Inc. headquartered in Athens, Ala., USA and Kensington Computer Products Group of ACCO Brands headquartered in San Mateo, Calif., USA. These types of I/O port security devices employ simple mechanical keys, which can be easily duplicated, lost or stolen.

Many companies utilize security software to monitor and inactivate I/O ports; however, as with any software, it can be altered, blocked or bypassed due to hacking or the insertion of malware into the host computer or network. Further, software solutions do not preclude malicious manipulation or circumvention of software security solutions if the abuser has sufficient administrative network rights.

I/O ports are often used to facilitate data transfer to and from removable storage devices. Portable storage devices (e.g., thumb drives, flash drives, etc.) which contain Random Access Memory (RAM) are often used to move data between a computer, a network and the portable storage device. Leaving a portable storage device installed in a computer I/O port also presents a security risk, since current portable storage devices have no method to be physically locked in an I/O port to prevent unauthorized removal when left unattended. Theft or loss of portable storage devices is also a major network security risk.

Encrypted flash drives, such as IronKey® available from Kingston Technology Company, Inc. of Fountain Valley, Calif., USA; however, these devices rely solely on software encryption for security protection affording no physical security protection from unauthorized removal and subsequent hacking using sophisticated techniques.

SUMMARY OF THE INVENTION

In view of the security risks associated with external devices connected to computers, there is a need for physical security devices which contain improved mechanical locking mechanisms for blocking unused I/O, ports thus preventing unauthorized access to the I/O port. Further, a need to provide a method to lock portable storage devices in I/O ports is needed to prevent theft or unauthorized removal of the portable storage device.

The present invention provides a mechanical locking device which can be used in computer I/O port security devices allowing the I/O port to be physically blocked, thus preventing the connection of any peripheral device to the I/O port. The mechanical locking device is configured to allow an I/O port security device to become unlocked from the I/O port upon command from the user to allow for the safe removal of the installed I/O port security device.

To further leverage such a computer I/O mechanical locking device, it is desirable to provide a derivative of a portable storage device, and in particular, a flash drive, containing a mechanical locking mechanism as discussed below, which physically locks the flash drive into a computer USB port preventing unauthorized removal of the flash drive from the USB port. The mechanical locking device is configured to allow the flash drive to be unlocked from the USB port upon command from the user to allow for safe removal of the flash drive from the USB port.

It is the object of the current invention to provide a mechanical locking device for use in computer security devices that can physically and automatically engage into I/O ports upon manual insertion of the security device into the I/O port. The locking feature is provided by locking arms or locking plates contained in the mechanical locking device which physically engage into or upon existing I/O port structural features such as shield tab holes or recesses. Following manual insertion, the locking arms or locking plates will not disengage from the I/O port preventing removal of a port security device.

It is another object of the current invention to allow for the repositioning of the locking arms or locking plates contained in the mechanical locking mechanism such that the locking arms or locking plates become physically disengaged from the I/O port. The locking arms or locking plates are mechanically repositioned to the unlocked condition by use of shape memory wire upon application of a direct current (DC) through the shape memory wire. A small DC voltage is applied to the shape memory wire to create a sufficient DC current in the shape memory wire such that the shape memory wire is heated and contracts causing mechanical movement. The application and removal of the DC voltage provides a suitable means to control the mechanical locking and unlocking functions. Upon disengagement of the locking arms or locking plates from the I/O port, the security device can be safely removed from the I/O port.

In some embodiments, the mechanical locking device is configured to allow engagement and disengagement into and from a USB I/O port (referred to herein as a "USB port").

In some embodiments, the mechanical locking device is configured to allow engagement and disengagement into and from an RJ-45 I/O port (referred to herein as an "RJ-45 port").

In some embodiments, the mechanical locking device is configured to allow engagement and disengagement into and from a serial I/O port (referred to herein as a "serial port").

In some embodiments, one or more locking arms are connected to a single cylindrical axle which is supported on each end by support plates that allow the axle and the locking arms to rotate about the axis of the axle in two directions. Rotation of the axle in one direction (the locking direction or the engaged direction) causes the locking arms to become physically engaged in the I/O port. Rotation of the axle in the opposite direction (the unlocking direction or the disengaged direction) causes the locking arms to become disengaged from the I/O port.

In some embodiments, a single locking plate is connected to a single cylindrical axle which is supported on each end by support plates that allow the axle and the locking plate to rotate about the axis of the axle in two directions. Rotation of the axle in one direction (the locking direction or the engaged direction) causes the locking plate to become physically engaged in the I/O port. Rotation of the axle in the opposite direction (the unlocking direction or the disengaged direction) causes the locking plate to become disengaged from the I/O port.

In some embodiments, the single locking plate is comprised of two locking tabs for engagement into and disengagement from a USB port.

In some embodiments, the axle is attached to a spring using a lower attachment pin located on the bottom surface of the axle. The spring thereby creates a moment between the lower attachment pin and the rotational axis of the axle. This arrangement provides a constant rotational bias on the axle in the locking direction such that when the mechanical locking device is inserted into an I/O port manually, the locking arms or locking plate automatically engages into the I/O port.

In some embodiments, the mechanical locking device is operated by shape memory wire. The shape memory wire utilized has mechanical properties which cause the wire to contract when heated above the activation temperature of the shape memory wire and to relax back to its original length when cooled sufficiently below the activation temperature. The shape memory wire is connected to an upper attachment pin via an insulating tab on the upper surface of the axle. The shape memory wire is referred to herein as the "primary wire". Upon contraction of the primary wire due to heating, a rotational moment is created between the upper attachment pin and the rotational axis of the axle causing the axle to rotate in the unlocking direction and thereby causing the locking arms or locking plate to become disengaged from the I/O port. The method of heating the primary wire is by the application of a DC current through the primary wire as discussed below. The insulating tab prevents the primary wire from making electrical contact with the axle or other adjacent components which are electrically conductive.

In some embodiments, the primary wire is attached to two metallic electrical pins forming an electrical circuit. Application of a DC voltage to the electrical pins creates a DC current flow through the primary wire causing it to be heated. The size and arrangement of the electrical pins is suitable to allow attachment of the electrical pins to a printed circuit board (PCB) within the security device, such that the DC voltage can be applied to the primary wire in a controlled fashion.

In some embodiments, a first upper attachment pin is fabricated from a low melting point metal alloy which will melt upon sufficient application of external heat to an I/O port security device. The specific alloy for the upper attachment pin is appropriately chosen such that the modulus temperature of the upper attachment pin is lower than the activation temperature of the primary wire attached to the upper attachment pin. If the upper attachment pin melts, the primary wire becomes detached from the axle, thereby preventing the primary wire from moving the axle in the unlocking direction.

In some embodiments, a second lower attachment pin is attached to the lower surface of the axle. A separate second length of shape memory wire is attached between the second lower attachment pin and a fixed point on the lower casing of the mechanical locking device. The second length of shape memory wire is referred to herein as the "secondary wire". The secondary wire has a lower activation temperature than the primary wire attached to the upper attachment pin. The secondary wire is not provided with an electrical circuit and can only be activated upon external heating of the I/O port security device. Upon sufficient external heating of the I/O port security device, the activation temperature of the secondary wire is reached before the activation temperature of the primary wire. Upon contraction of the secondary wire due to external heating, a torsional moment is created between the second, lower attachment pin and the rotational axis of the axle causing the axle to rotate in the locking direction, thereby preventing disengagement of the locking arms or locking plate from the I/O port.

In some embodiments, the mechanical locking device is attached to a portable storage device, such as a flash memory device for use in a USB port, thus allowing the flash memory device to be physically locked and unlocked in and from a USB port.

In some embodiments, the mechanical locking device is enclosed within a metallic or nonmetallic casing. A first volume, referred to herein as the "internal volume", is located within that portion of the casing contained within the I/O port when the mechanical locking device is fully inserted into the I/O port. A second volume, referred to herein as the "external volume", is located within that portion of the casing which is external to the I/O port when the mechanical locking device is fully inserted into the I/O port. The casing comprises an open side proximate to the computer I/O port such that the casing is configured to receive the computer port through the open side into the internal volume. The external volume of the casing forms a contiguous shell thereby preventing tampering of enclosed mechanical locking device by insertion of external tools or foreign objects.

In some embodiments, the casing of the mechanical locking device is fabricated from material having a sufficiently low thermal conductivity thereby providing a thermally insulated volume for the primary wire which prevents the unwanted thermal activation of the primary wire due to external heating of the security device. In other embodiments, the casing can be lined or coated, either internally or externally, with a material having low thermal conductivity.

In some embodiments, some or all of the moving pieces of the mechanical locking device are constructed from materials which are nonmagnetic.

In some embodiments, the casing of the mechanical locking device contains one or more tamper evident labels which are activated upon the application of external heat.

Unless otherwise defined, all technical and scientific terms used herein have the same meaning as commonly understood by one of ordinary skill in the art to which this invention belongs. Although other methods and materials that are similar, or equivalent to those described herein can be used in the practice or testing of the present invention, suitable methods and materials are described below for purposes of explanation. In case of conflict, the patent specification, including definitions, will control. In addition, the materials, methods, and examples are illustrative only and are not intended to be limiting.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
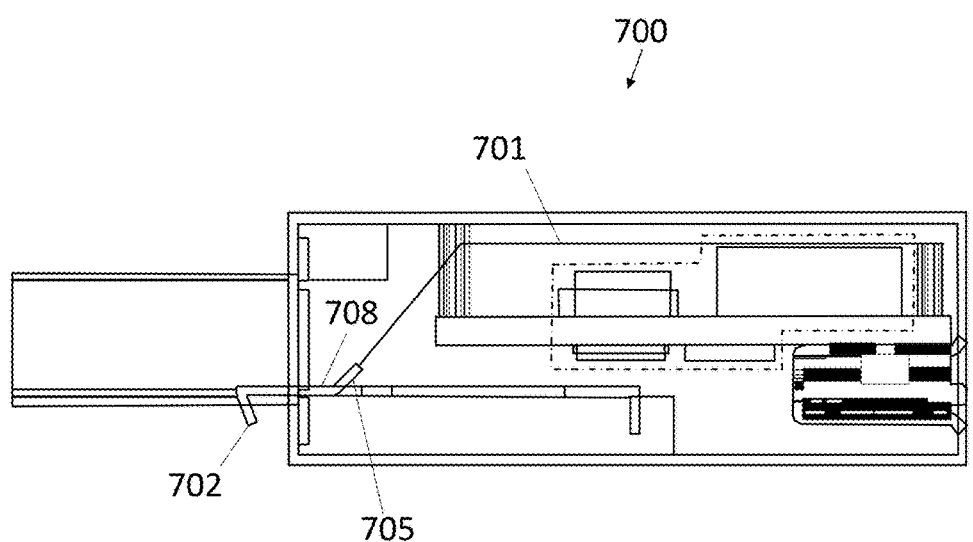

Having thus described embodiments of the invention in general terms, reference will now be made to the accompanying drawings, wherein:

FIG. 1 schematically illustrates a prior art USB security device for preventing access to a USB port based on U.S. Patent Application Publication Nos. 2016/0012260 A1, 2016/0012259 A1 and 2016/0012258 A1.

Figure 2:
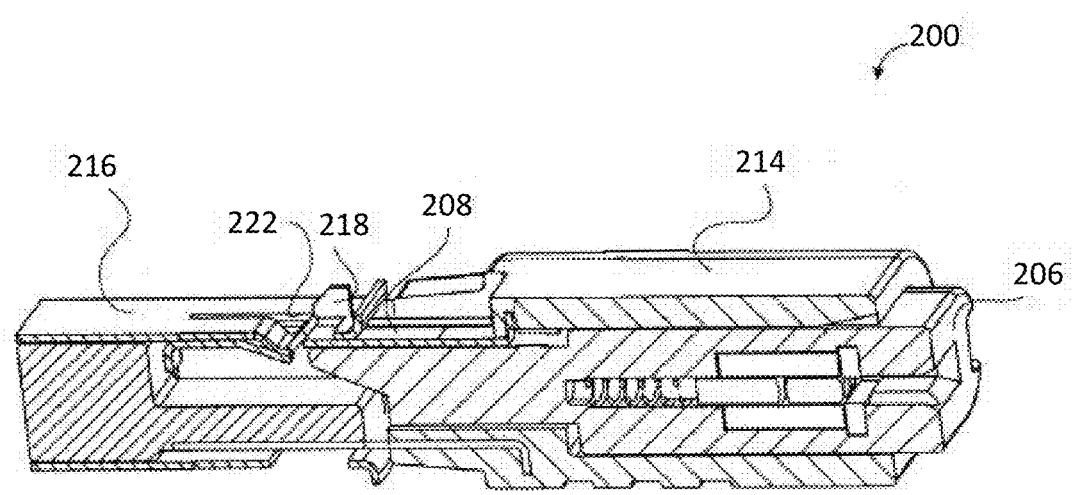

FIG. 2 schematically illustrates a prior art USB security device for preventing access to a USB port based on U.S. Patent Application Publication No. 2008/0041125 A1.

Figure 3:
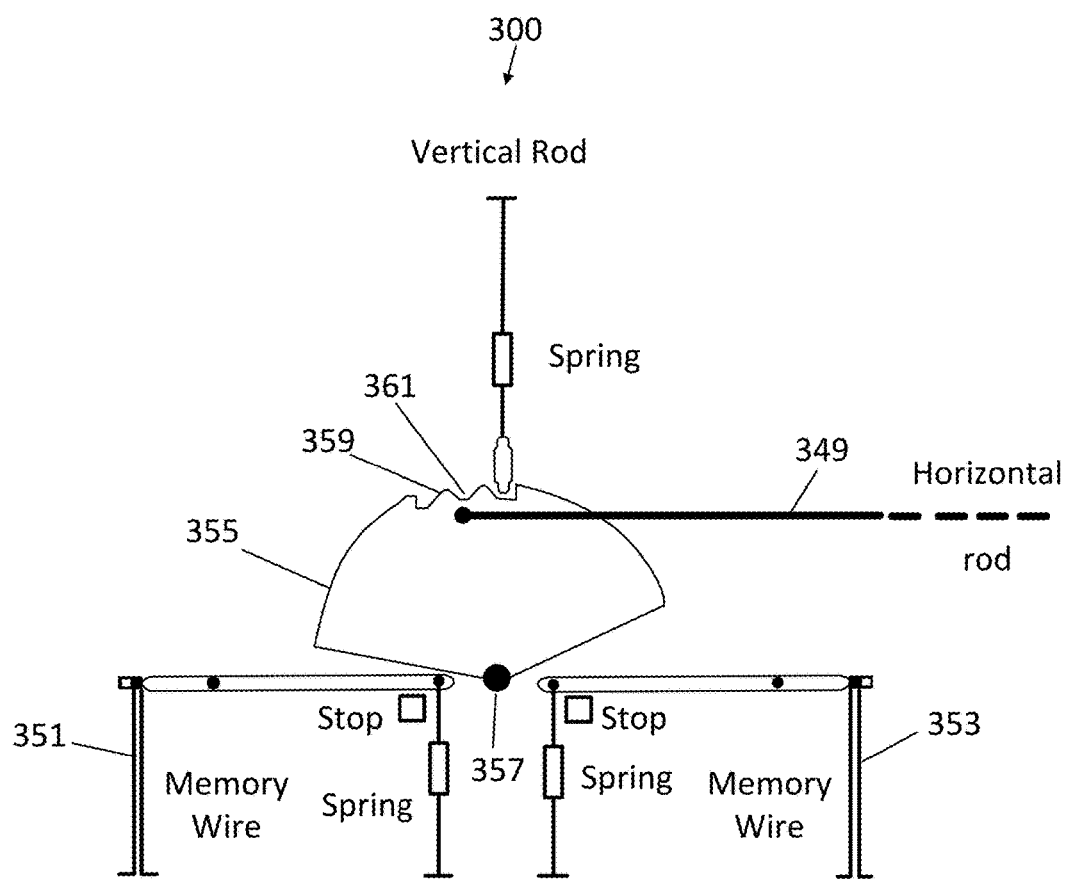

FIG. 3 schematically illustrates a prior art security device which uses shape memory wire for a general purpose locking mechanism based on U.S. Patent Application Publication No. 2007/0132551 A1.

Figure 4:
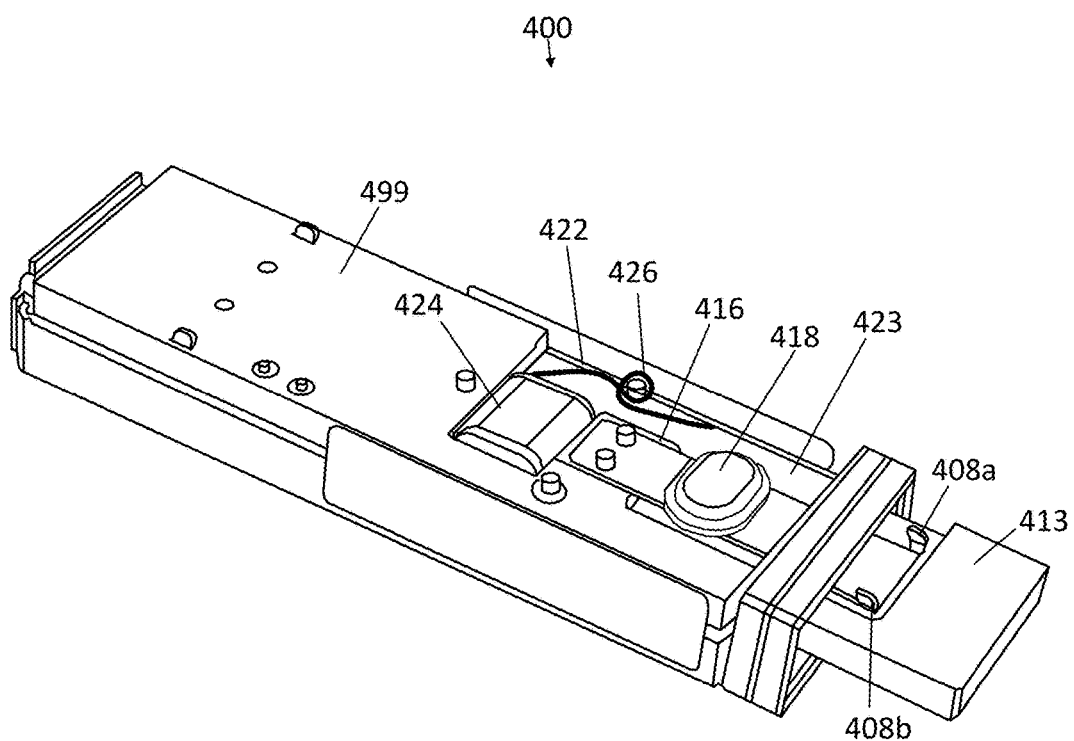

FIG. 4 schematically illustrates a prior art USB security device for preventing access to a USB port based on U.S. Patent Application Publication No. 2015/0020189 A1.

Figure 5:
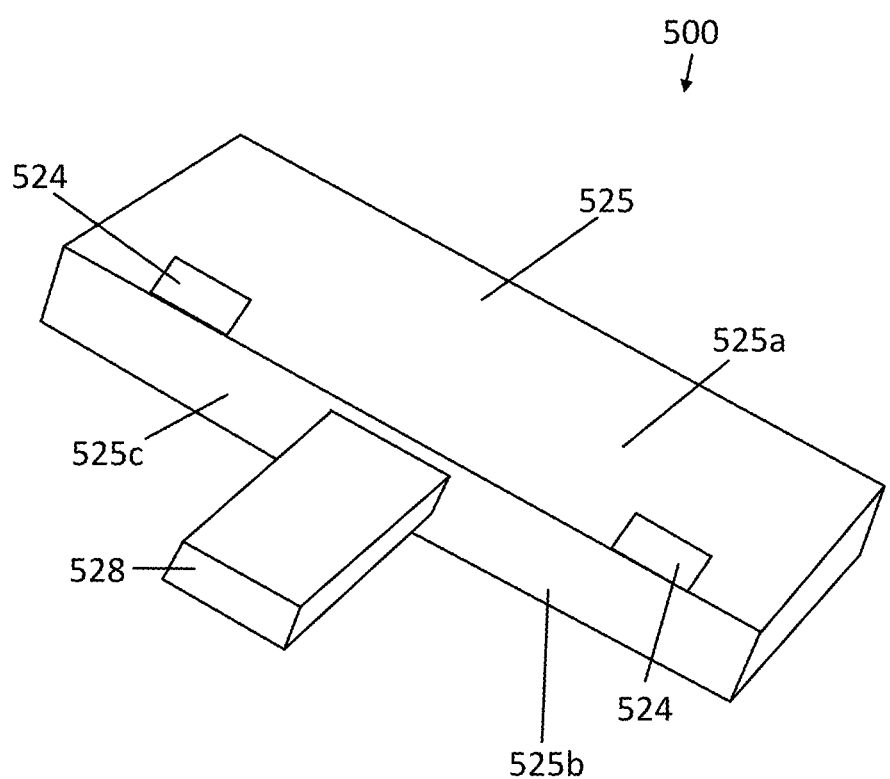

FIG. 5 schematically illustrates a prior art USB security device for preventing access to a USB port based on PCT Application Publication No. WO2013042108.

Figure 6:
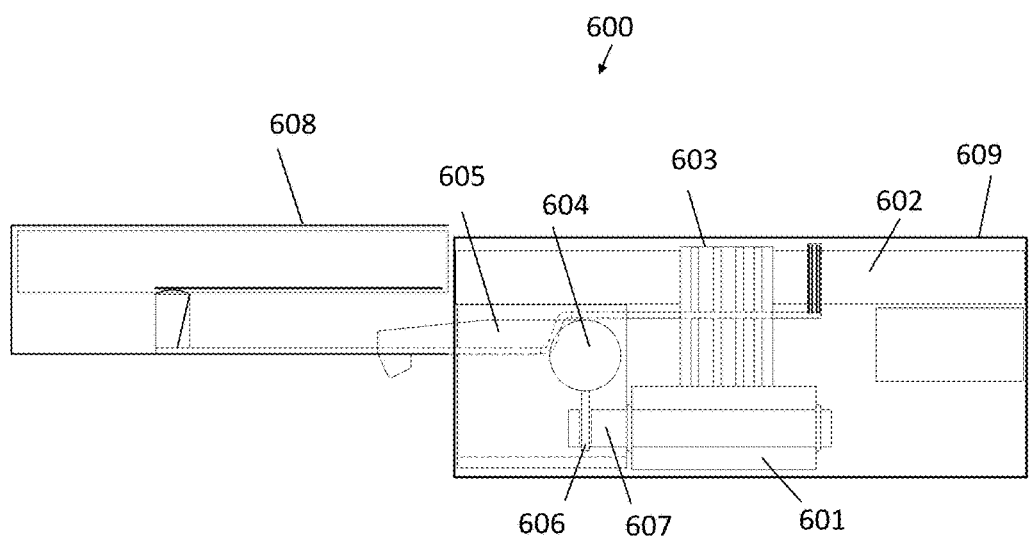

FIG. 6 schematically illustrates a prior art USB security device for preventing access to a USB port based on U.S. Pat. No. 9,460,319 B1.

Figure 7A:
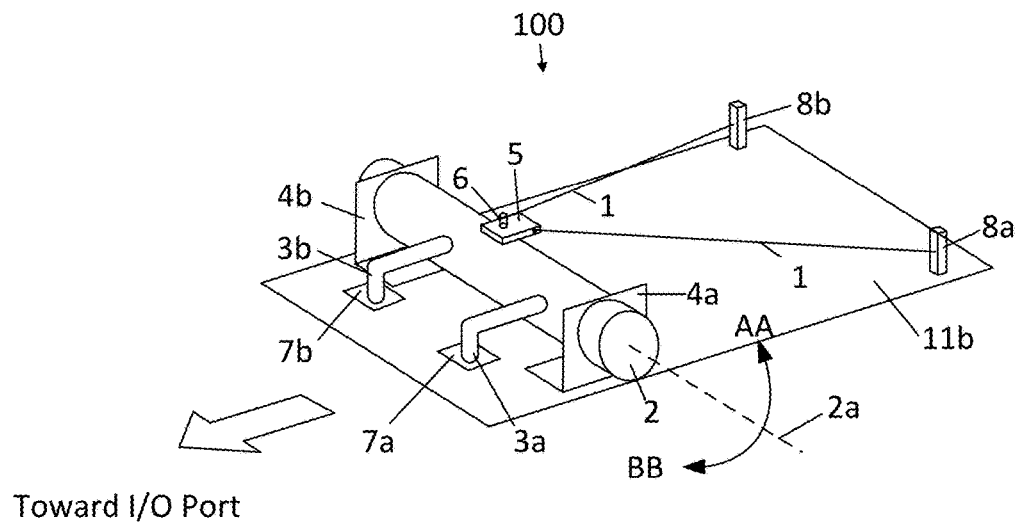

FIG. 7a illustrates an orthographic projection of certain parts of a mechanical locking device according to an exemplary embodiment of the present invention for use in a USB I/O port wherein two locking arms 3a, 3b are used to engage the USB port.

Figure 7B:
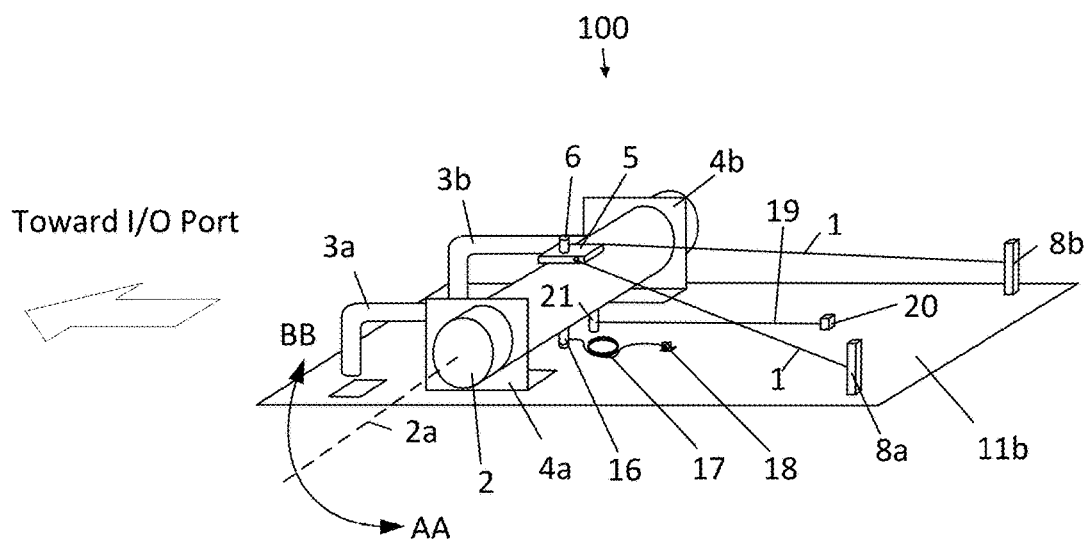

FIG. 7b illustrates an orthographic projection of certain parts of the mechanical locking device for use in a USB port wherein FIG. 7b illustrates components not visible in FIG. 7a.

Figure 7C:
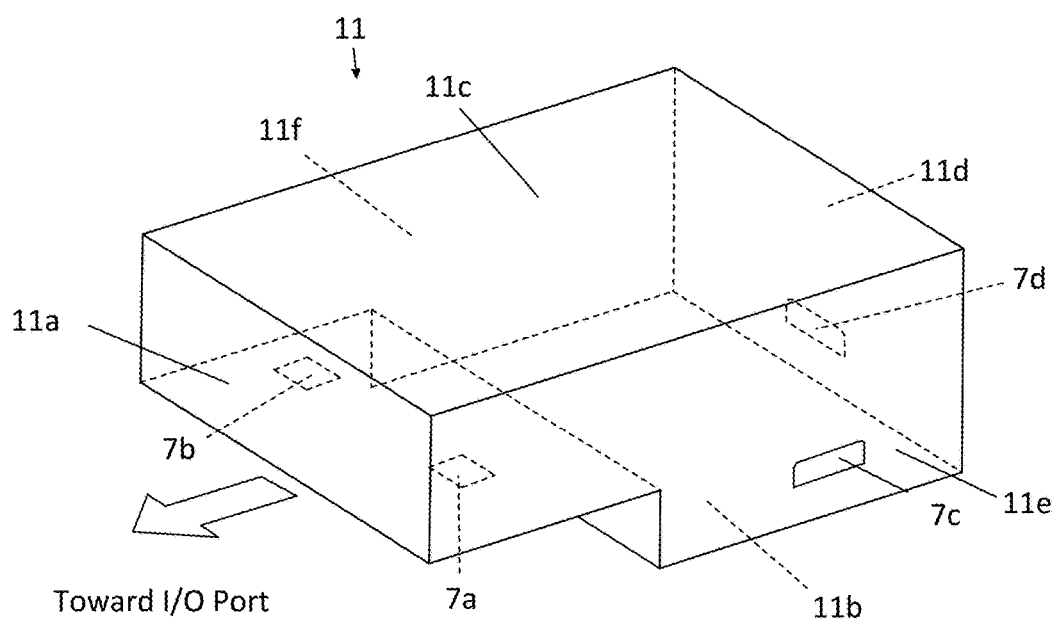

FIG. 7c illustrates an orthographic projection of certain parts of the mechanical locking device for use in a USB port wherein FIG. 7c illustrates components not visible in FIG. 7a or FIG. 7b.

Figure 8A:
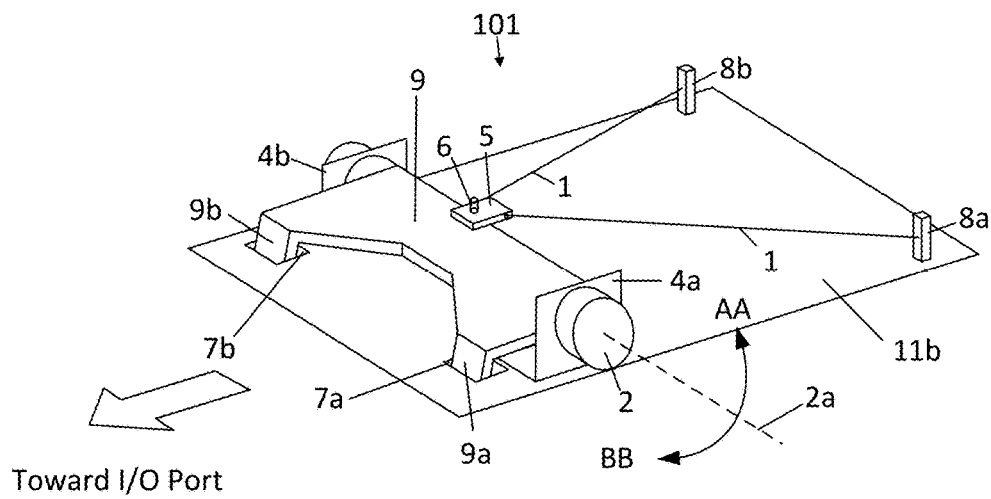

FIG. 8a illustrates an orthographic projection of certain parts of a mechanical locking device according to an exemplary embodiment of the present invention for use in a USB port wherein a single locking plate 9 and two locking plate tabs 9a, 9b are used to engage the USB port.

Figure 8B:
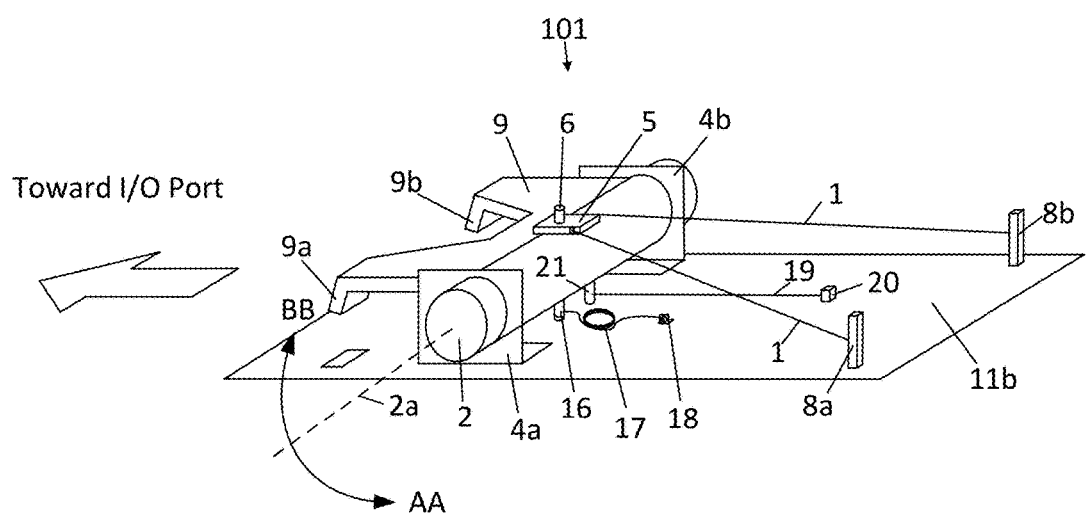

FIG. 8b illustrates an orthographic projection of certain parts of the mechanical locking device for use in a USB port wherein FIG. 8b illustrates components not visible in FIG. 8a.

Figure 8C:
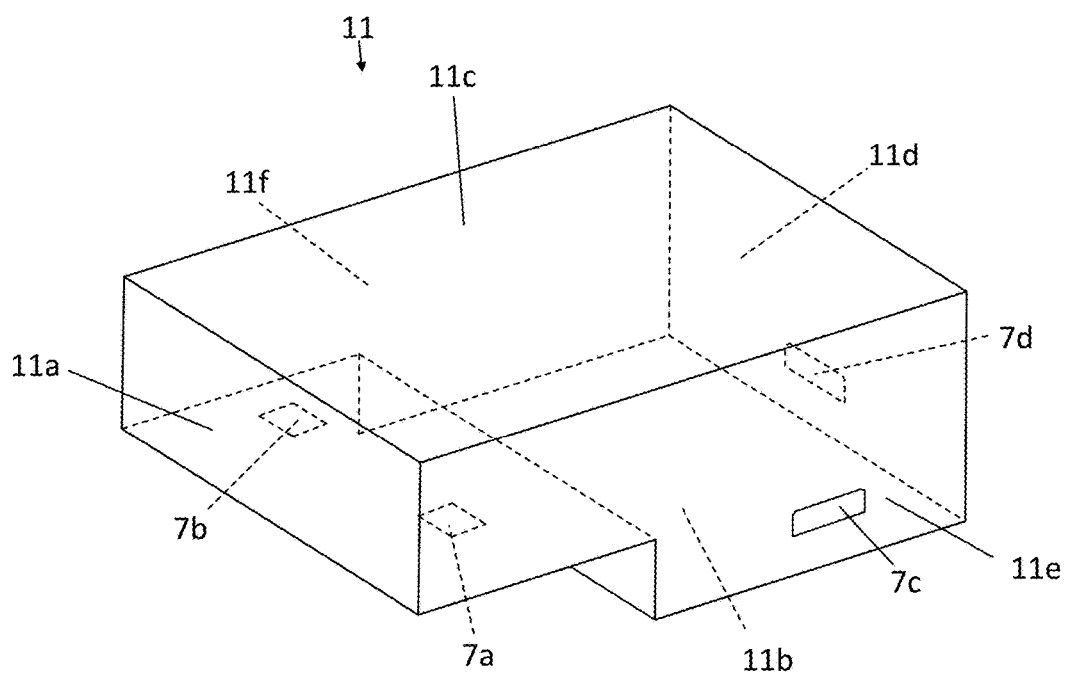

FIG. 8c illustrates an orthographic projection of certain parts of the mechanical locking device for use in a USB port wherein FIG. 8c illustrates components not visible in FIG. 8a or FIG. 8b.

Figure 9A:
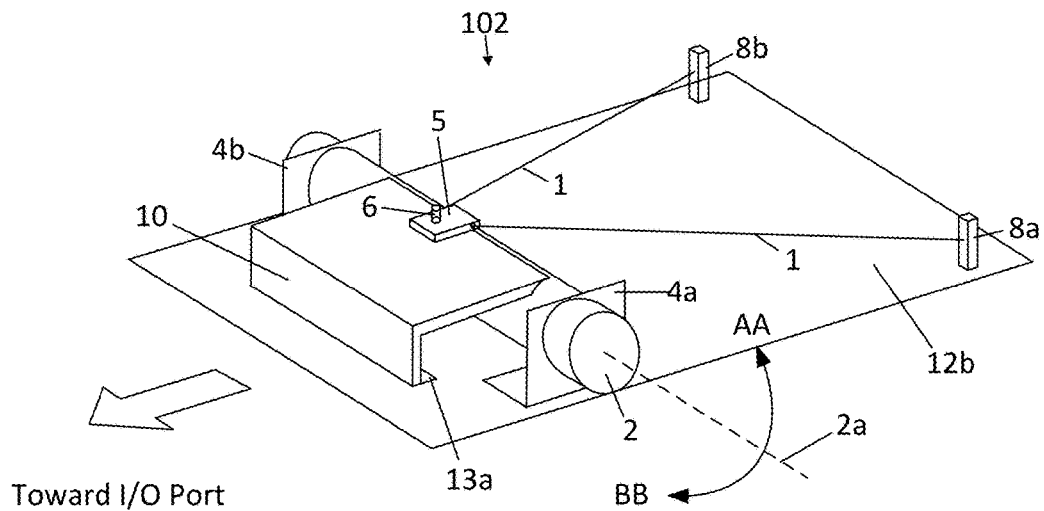

FIG. 9a illustrates an orthographic projection of certain parts of a mechanical locking device according to an exemplary embodiment of the present invention for use in a RJ-45 port.

Figure 9B:
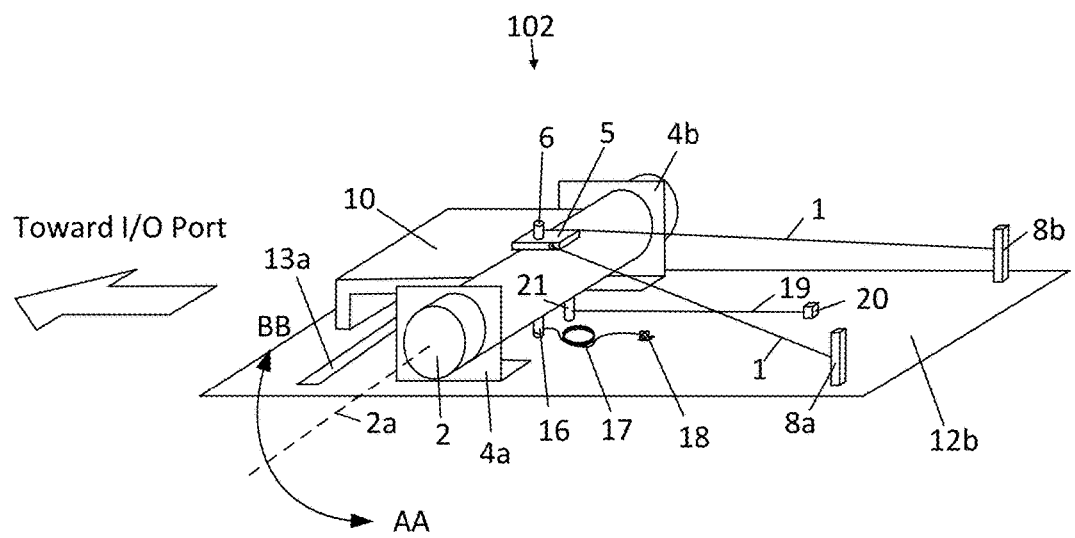

FIG. 9b illustrates an orthographic projection of certain parts of the mechanical locking device for use in a RJ-45 port wherein FIG. 9b illustrates components not visible in FIG. 9a.

Figure 9C:
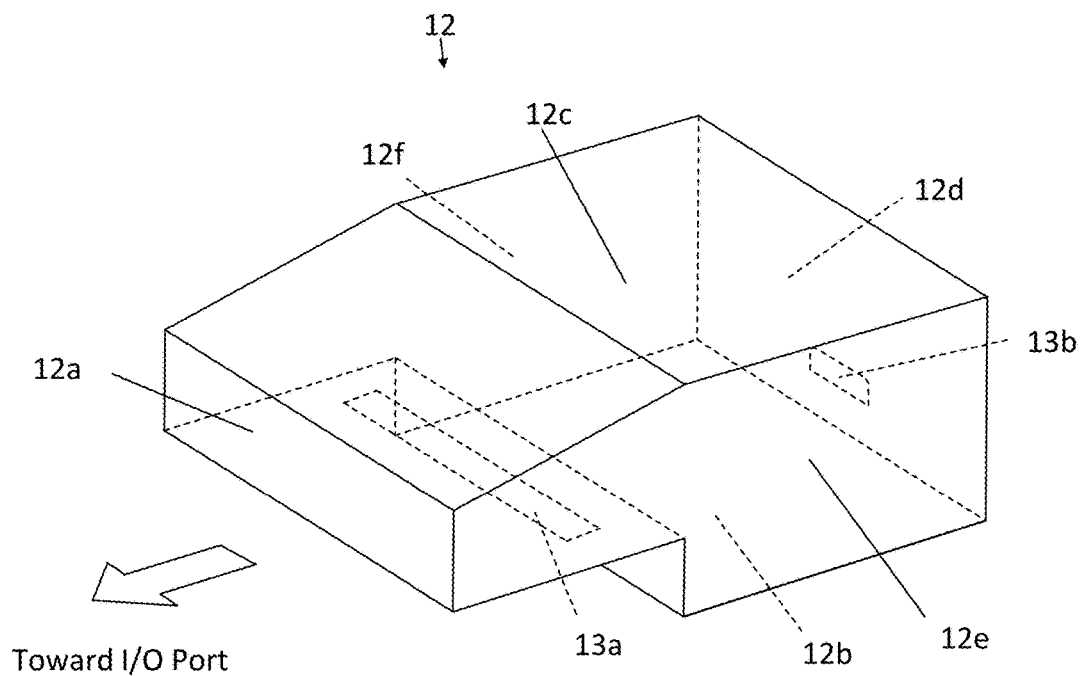

FIG. 9c illustrates an orthographic projection of certain parts of the mechanical locking device for use in a RJ-45 port wherein FIG. 9c illustrates components not visible in FIG. 9a or FIG. 9b.

Figure 10A:
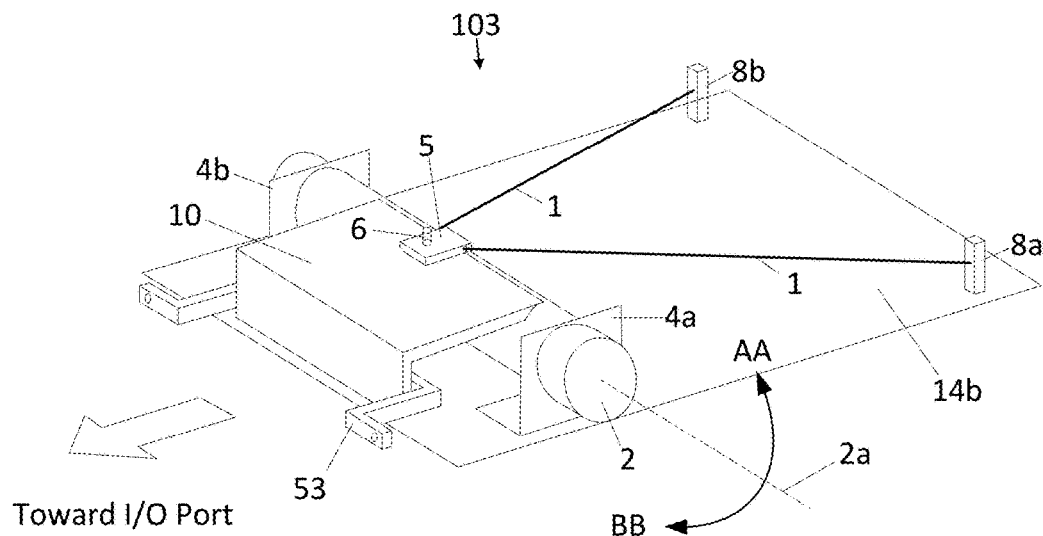

FIG. 10a illustrates an orthographic projection of certain parts of a mechanical locking device according to an exemplary embodiment of the present invention for use in a serial port.

Figure 10B:
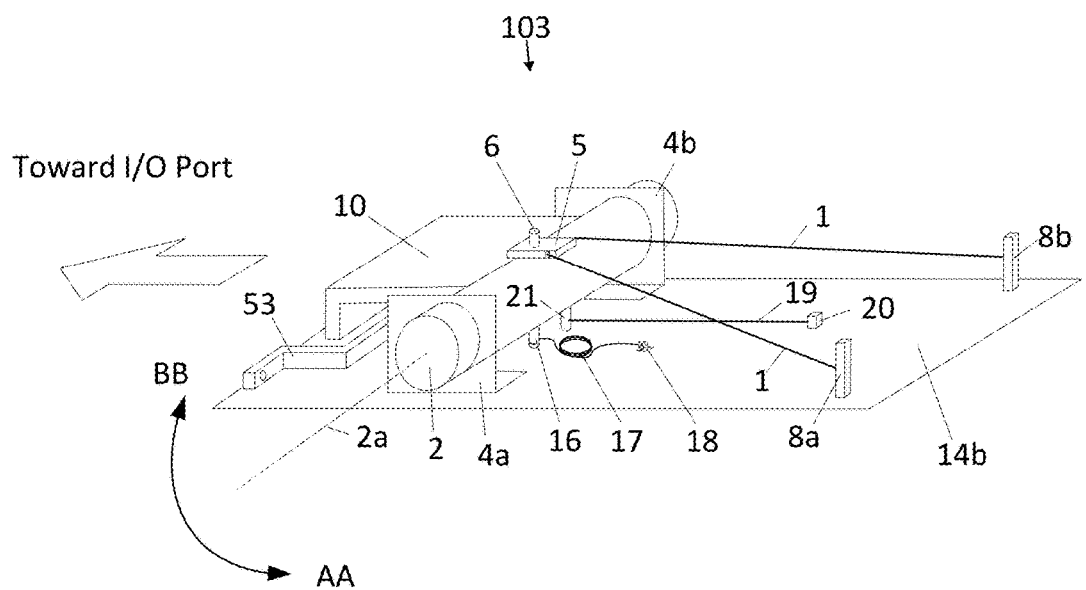

FIG. 10b illustrates an orthographic projection of certain parts of the mechanical locking device for use in a serial port wherein FIG. 10b illustrates components not visible in FIG. 10a.

Figure 10C:
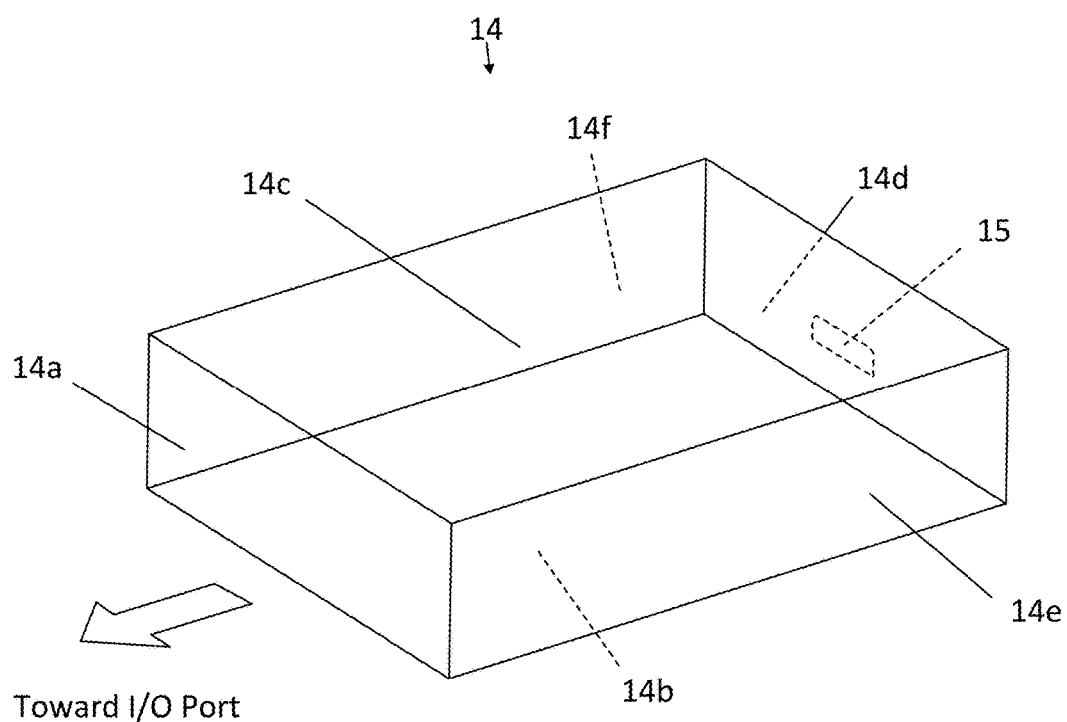

FIG. 10c illustrates an orthographic projection of certain parts of the mechanical locking device for use in a serial port wherein FIG. 10c illustrates components not visible in FIG. 10a or FIG. 10b.

Figure 11A:
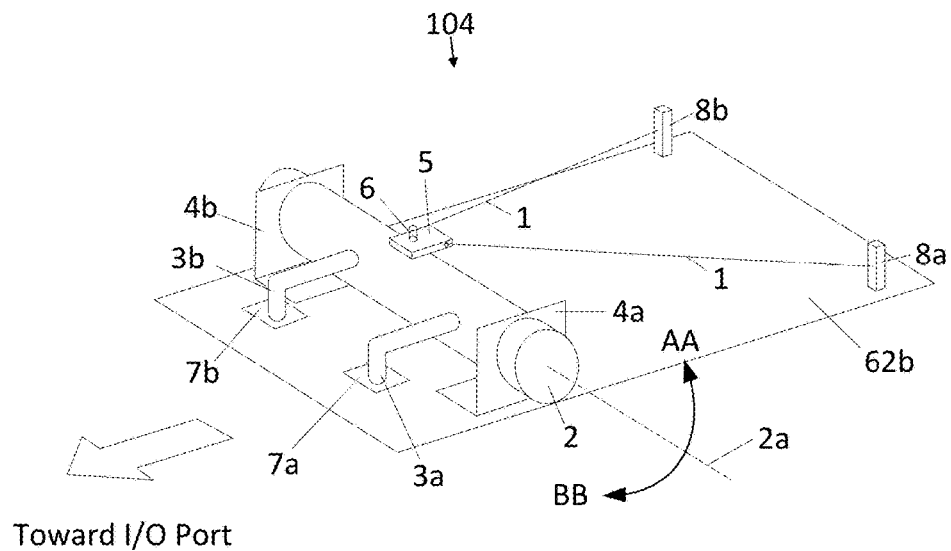

FIG. 11a illustrates an orthographic projection of certain parts of a mechanical locking device according to an exemplary embodiment of the present invention for use in a locking portable storage device, and in particular a locking flash drive, for a USB port wherein two locking arms 3a, 3b are used to engage the USB port.

Figure 11B:
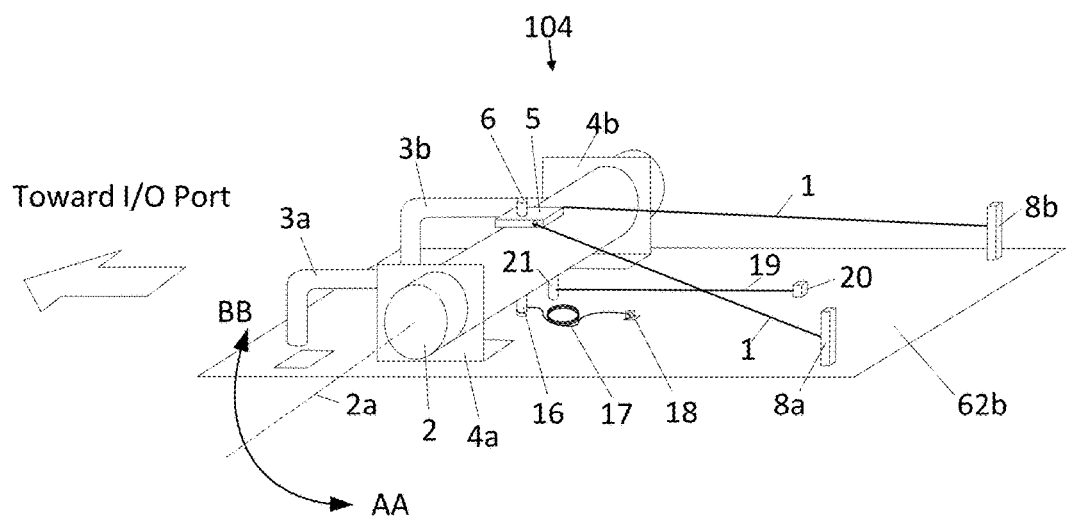

FIG. 11b illustrates an orthographic projection of certain parts of the mechanical locking device for use in a locking portable storage device, and in particular a locking flash drive, for a USB port wherein FIG. 11b illustrates components not visible in FIG. 11a.

Figure 11C:
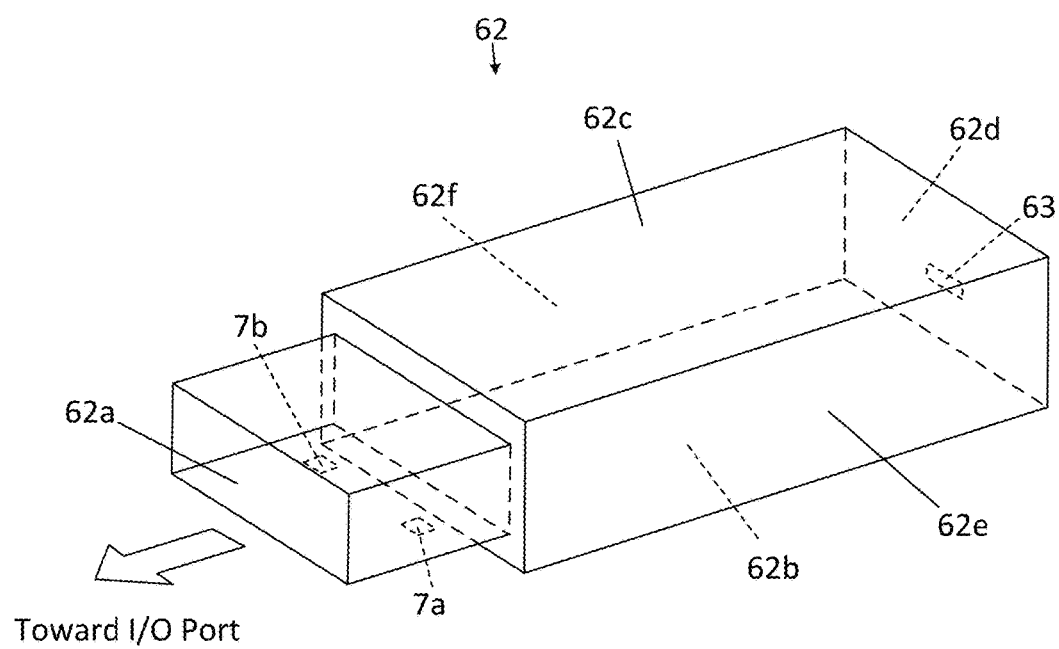

FIG. 11c illustrates an orthographic projection of certain parts of the mechanical locking device for use in a locking portable storage device, and in particular a locking flash drive, for a USB port wherein FIG. 11c illustrates components not visible in FIG. 11a or FIG. 11b.

Figure 12A:
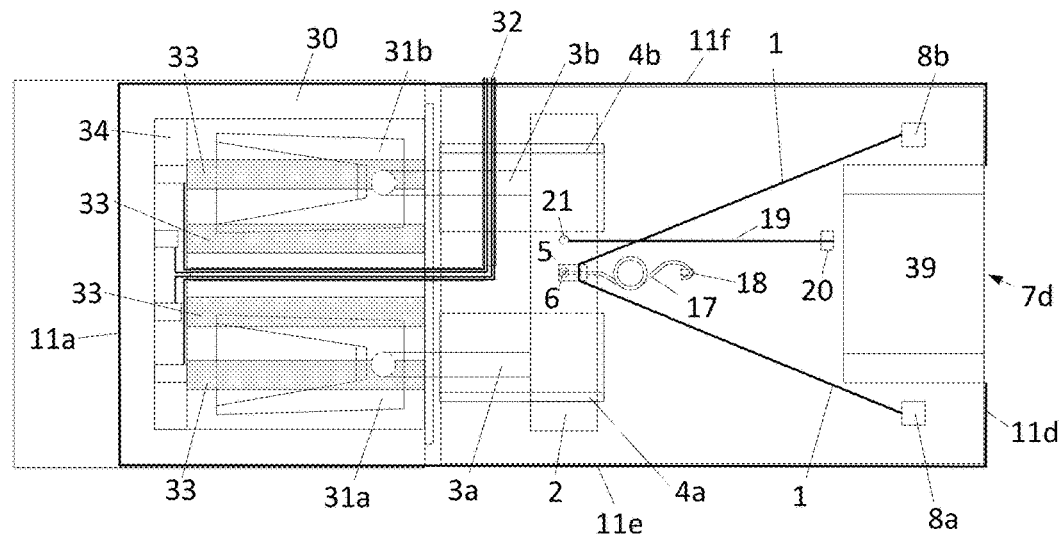

FIG. 12a illustrates a top, cut-away view of a mechanical locking device according to an exemplary embodiment of the present invention and how the mechanical locking device may be physically configured in a USB port security device.

Figure 12B:
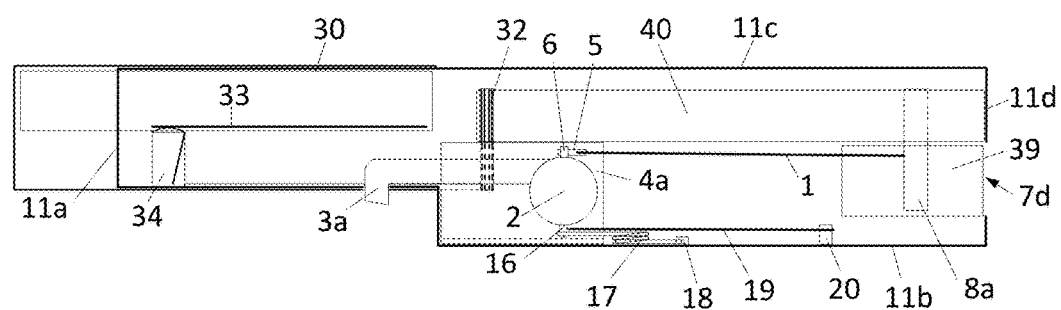

FIG. 12b illustrates a side, cut-away view of the mechanical locking device and how the mechanical locking device may be physically configured in a USB port security device.

Figure 13A:
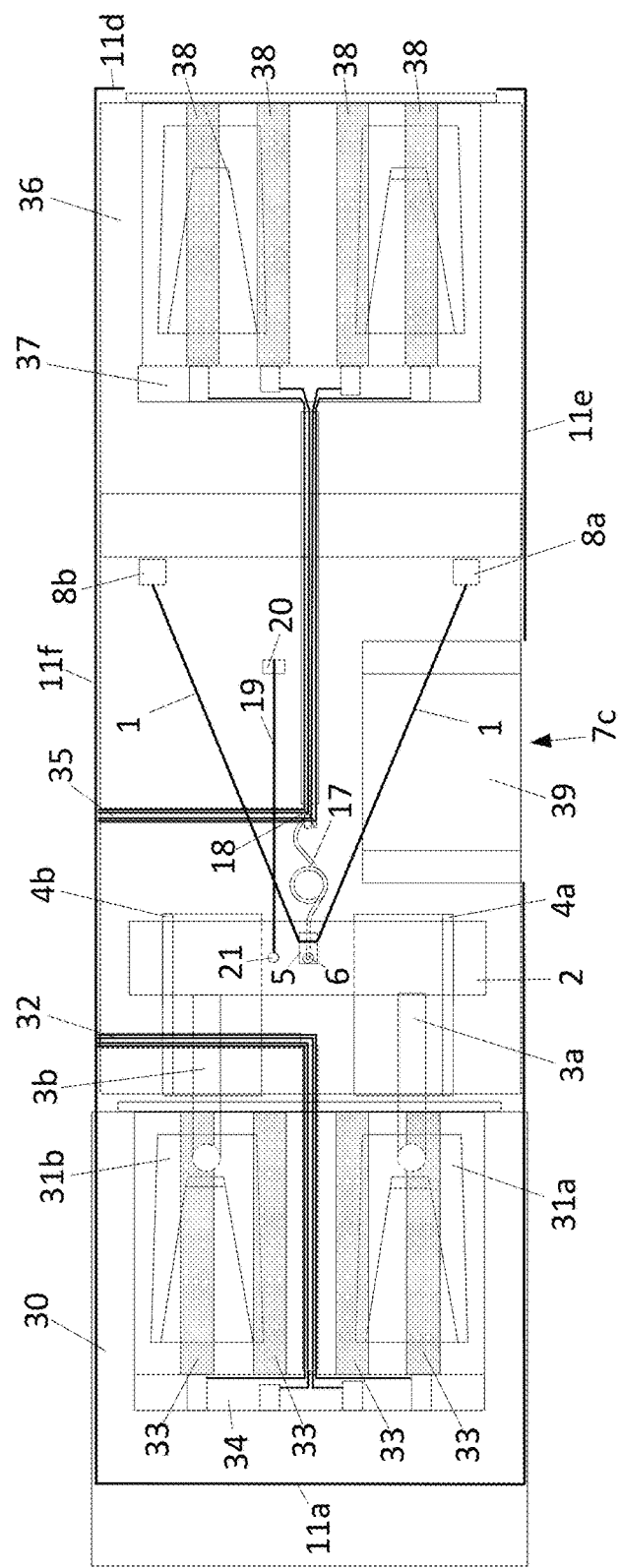

FIG. 13a illustrates a top, cut-away view of a mechanical locking device according to an exemplary embodiment of the present invention and how the mechanical locking device may be physically configured in a USB port security device that monitors peripheral equipment attached to the USB port.

Figure 13B:
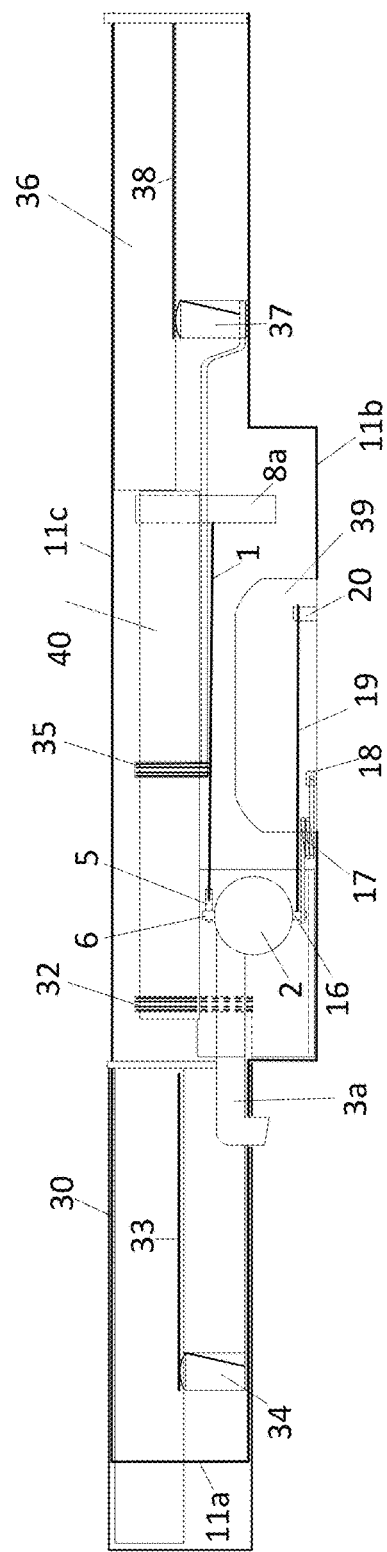

FIG. 13b illustrates a side, cut-away view of the mechanical locking device and how the mechanical locking device may be physically configured in a USB port security device that monitors peripheral equipment attached to the USB port.

Figure 14A:
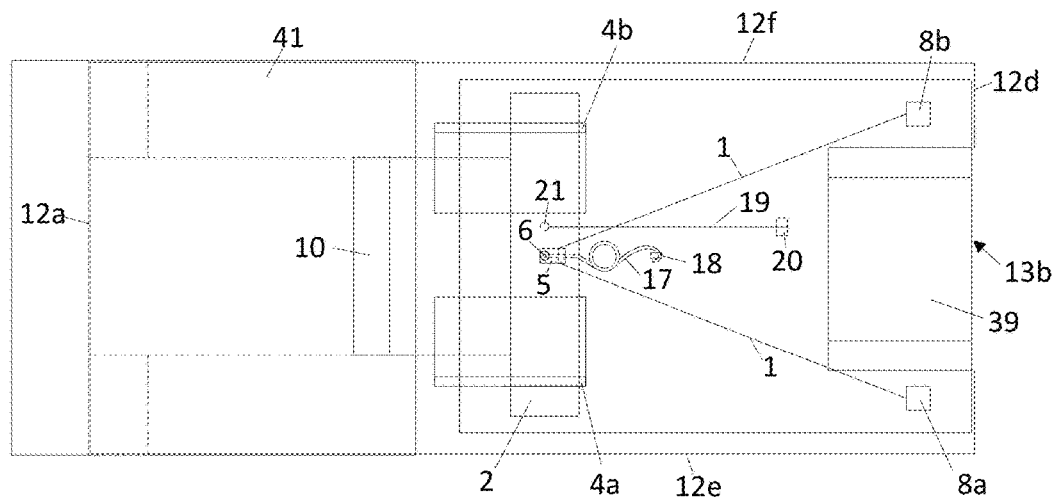

FIG. 14a illustrates a top, cut-away view of a mechanical locking device according to an exemplary embodiment of the present invention and how the mechanical locking device may be physically configured in a RJ-45 port security device.

Figure 14B:
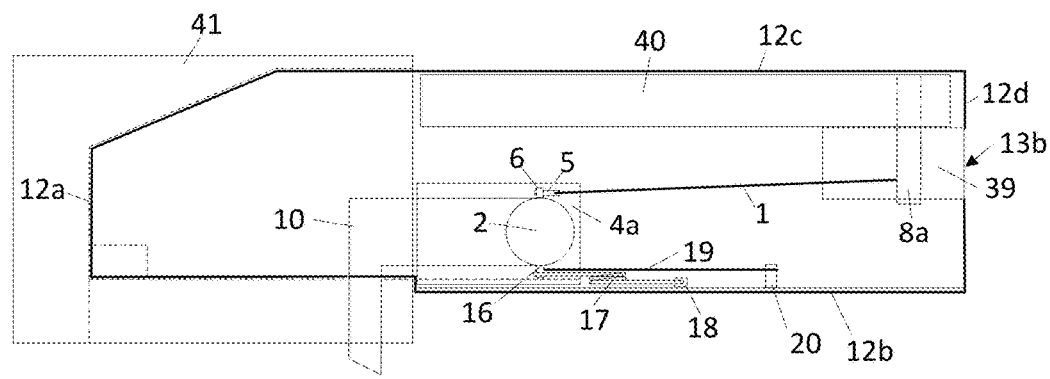

FIG. 14b illustrates a side, cut-away view of the mechanical locking device and how the mechanical locking device may be physically configured in a RJ-45 port security device.

Figure 15A:
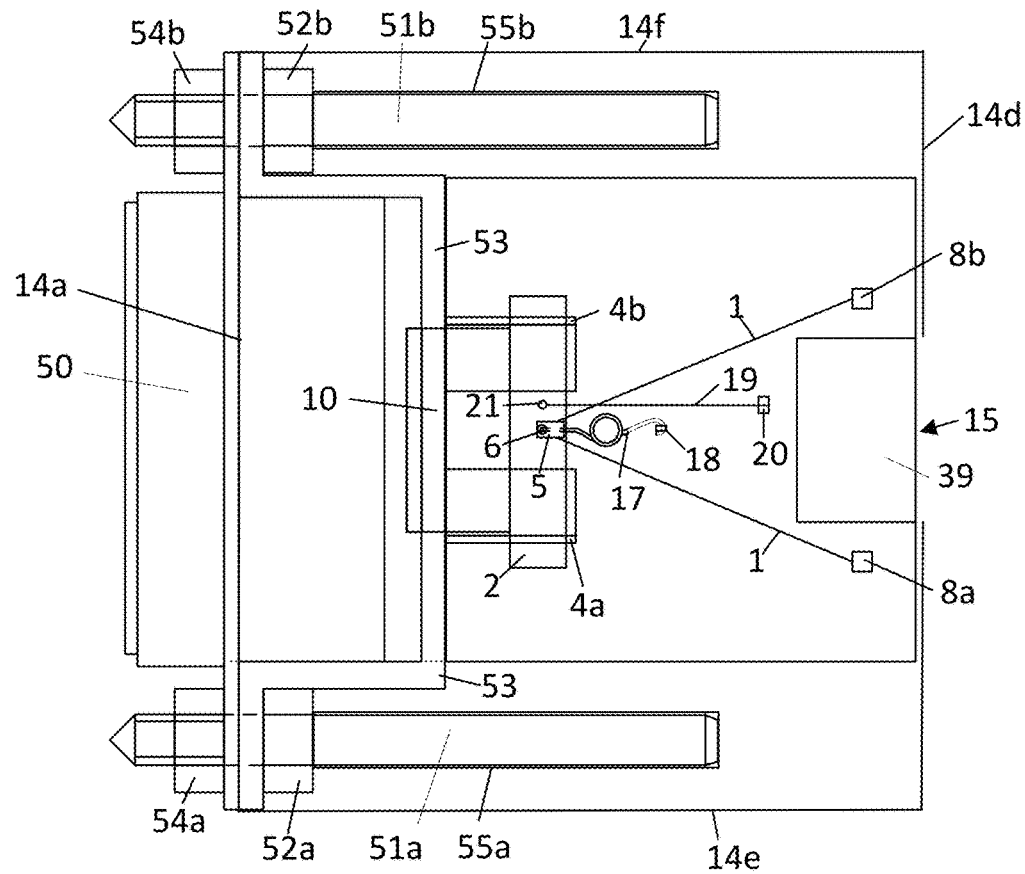

FIG. 15a illustrates a top, cut-away view of a mechanical locking device according to an exemplary embodiment of the present invention and how the mechanical locking device may be physically configured in a serial port security device.

Figure 15B:
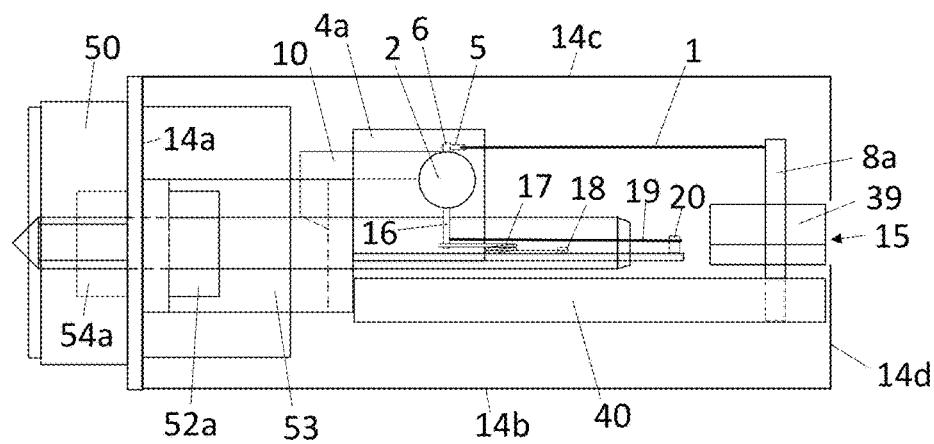
Figure 16A:
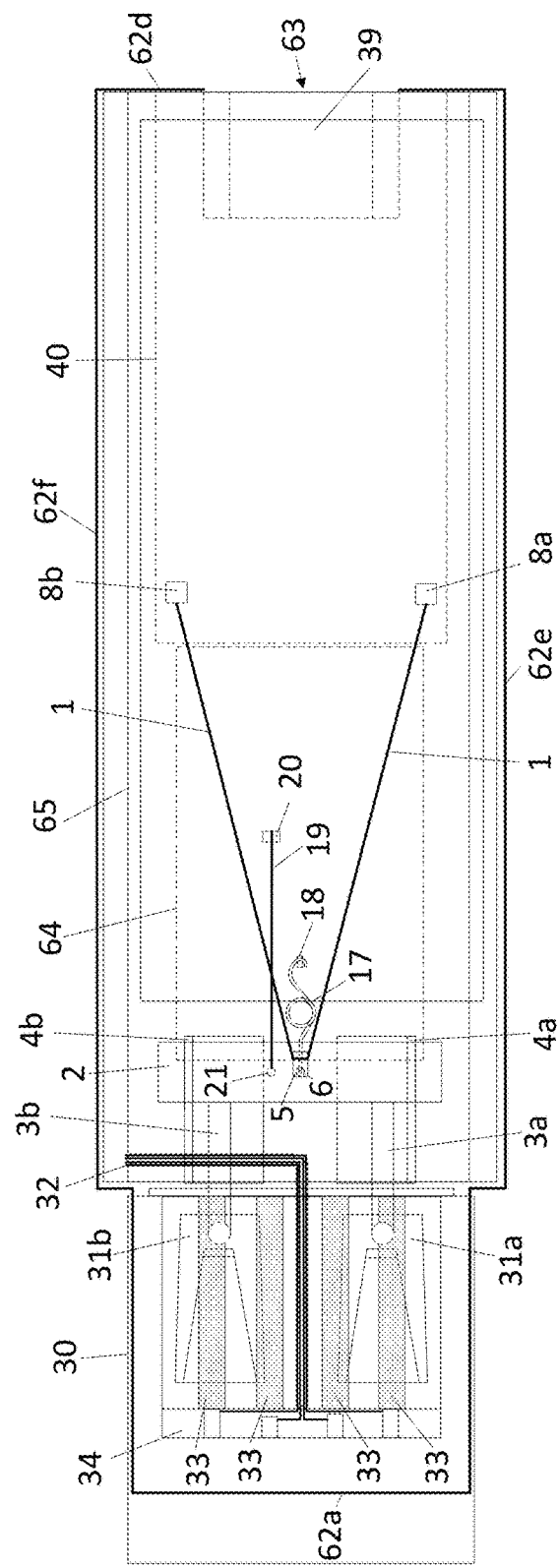

FIG. 15b illustrates a side, cut-away view of the mechanical locking device and how the mechanical locking device may be physically configured in a serial port security device FIG. 16a illustrates a top, cut-away view of a mechanical locking device according to an exemplary embodiment of the present invention and how the mechanical locking device may be physically configured for use in a USB port locking portable storage device, and in particular a locking flash drive.

Figure 16B:
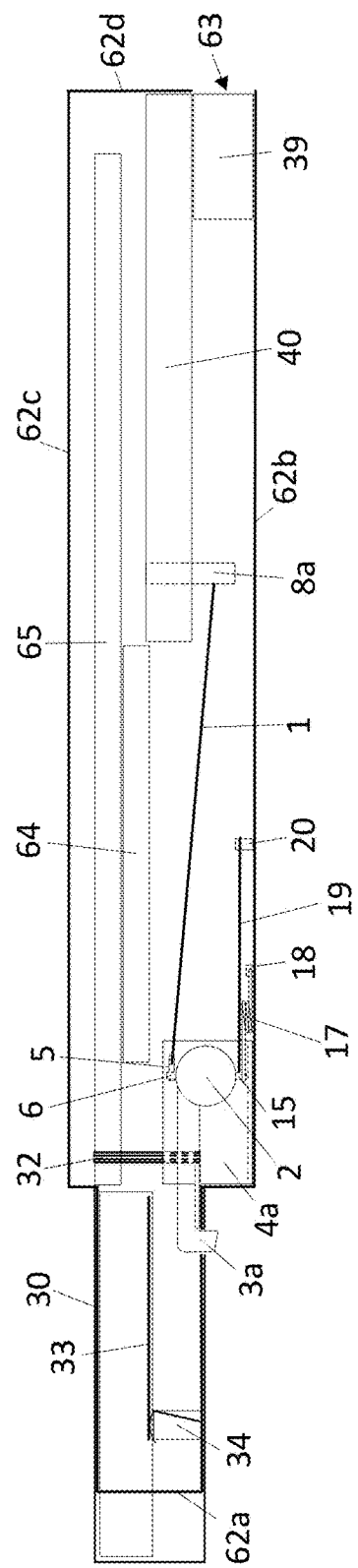

FIG. 16b illustrates a side, cut-away view of the mechanical locking device and how the mechanical locking device may be physically configured for use in a USB port locking portable storage device, and in particular a locking flash drive.

Certain exemplary embodiments of the invention are described herein, by way of illustration only, with reference to the accompanying drawings. With specific reference to the drawings in detail, it is stressed that the particulars shown are by way of example and for purposes of illustrative discussion of various preferred embodiments of the present invention only, and are presented in the cause of providing what is believed to be the most useful and readily understood description of the principles and conceptual aspects of the invention. The description taken with the drawings makes apparent to those skilled in the art how the various forms of the invention may be embodied in practice.

DETAILED DESCRIPTION OF EMBODIMENTS OF THE INVENTION

Embodiments of the present invention will now be described more fully hereinafter with reference to the accompanying drawing figures, in which some, but not all, embodiments of the invention are shown. Indeed, the invention may be embodied in many different forms and should not be construed as limited to the exemplary embodiments set forth herein; rather, these exemplary embodiments are provided so that this disclosure will both sufficiently and accurately convey the scope of the present invention to those skilled in the relevant art Like numbers refer to the same, similar or like elements throughout. Where possible, any terms expressed in the singular form herein are meant to also include the plural form and vice versa, unless explicitly stated otherwise. As used herein, the term "a" and/or "an" shall mean "one or more," even though the phrase "one or more" may also be used herein.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments of the present invention are directed to a security device for a computer I/O port. Other embodiments are directed to a mechanical locking device which is suitable for use in a computer I/O port security device. Still other embodiments are directed to a locking portable storage device, and in particular a locking flash drive which uses a mechanical locking device, as described herein. The security devices referenced or referred to, in accordance with various embodiments of the invention, are configured for providing physical protection both for computer I/O ports that are in use and also for unused computer I/O ports.

The term "computer ports," as used herein refers to physical I/O ports or physical interfaces associated with desktop computers, laptop computers, other computing devices, servers, endpoint devices of a network and other electronic devices. Computer ports are typically provided on or are a part of electronic devices, and are configured to be coupled with a complementary I/O port connector for transfer of data and/or power. Non-limiting examples of computer ports include serial, parallel, Ethernet, FireWire, Universal Serial Bus (USB), eSATA, Thunderbolt, Lightning, DisplayPort, Fiber Channel, High-Definition Multimedia Interface, Digital Visual Interface, Serial Digital Interface, S/PDIF, fiber optic, coaxial, RJ-45, RS-232, RS-422, IEEE1394, SFP ports and industrial communication ports. Computer ports, as referred to collectively herein, include all existing variants of the aforementioned standards and future variants. For example, the term "USB" in one instance refers to USB 1.0, USB 2.0, USB 3.0, and any other variant of the Universal Serial Bus standard. As used herein, the term "I/O port connector" refers to a connector designed to connect to a computer port or physical I/O port. As such, a computer port or an I/O port connector is often configured to support more than one physical interface, for example, a Thunderbolt port or connector may also support Fiber Channel.

Furthermore, the use of the term "male" and "female" in the claims and this specification refer to their commonly understood usage in the art when referring to I/O port connectors. Each half of a pair of mating I/O port connectors is conventionally assigned the designation male or female. The female connector is generally a receptacle that receives and holds the male connector. If a particular port connector design does not have a male or female physical form, then, for purposes of this disclosure, the terms male and female are used herein simply to distinguish between the two physical sides of a connection and are interchangeable.

One-directional or bi-directional electronic signals are sent across a connected or mated computer port and the I/O port connector. The signals sent across a mated pair of I/O port connectors are configured to encode information and the signal typically takes a physical form adapted for this purpose, e.g., electrical waves, light waves, etc. Signals sent across a mated pair of I/O port connectors typically also include electrical current used to power a connected device.

FIG. 1 illustrates a prior art USB security device 700 for preventing access to a USB port based on U.S. Patent Application Publication Nos. 2016/0012260 A1, 2016/0012259 A1 and 2016/0012258 A1. The security device 700 contains a spring metal lift arm 708 from which two locking teeth 702 are formed proximate to a portion of the security device that engages with the USB port. The locking teeth 702 engage in the lower tab shield holes of the USB port when the security device 700 is in the locked condition. A lifting peg 705 is attached to the upper surface of the spring metal lift arm 708. A shape memory wire 701, such as FLEXINOL® actuator wire available from DYNALLOY, Inc. of Irvine Calif., USA, is attached to the lifting peg 705. Upon application of electrical current to the shape memory wire 701, the shape memory wire 701 is heated which causes the shape memory wire 701 to contract, and thereby moving the spring metal lift arm 708 upwards. The upward movement of the spring metal lift arm 708 disengages the locking teeth 702 from the USB tab shield holes allowing the security device 700 to be removed from the USB port. Shortly after unlocking and removing the security device 700 from the USB port, current to the shape memory wire 701 is ceased and the shape memory wire 701 cools, allowing the shape memory wire 701 to return to its original length. The return of the shape memory wire 701 to its original length removes the upward force on the spring metal lift arm 708, thereby allowing the spring metal lift arm 708 to move downward to its locked condition.

U.S. Patent Application Publication Nos. 2016/0012260 A1, 2016/0012259 A1 and 2016/0012258 A1 disclose a similar mechanical locking device for RJ-45 and serial ports; however, the patent application publications do not disclose any relevant details nor provide any figures regarding how the similar mechanical locking devices function for the RJ-45 and serial port ports.

While the mechanical locking devices described in U.S. Patent Application Publication Nos. 2016/0012260 A1, 2016/0012259 A1 and 2016/0012258 A1 provides a general solution for the problem of security for a computer I/O port, the design of the mechanical locking device contains fundamental design flaws and suffers from several severe security vulnerabilities.

Firstly, the design of the mechanical locking device assumes that the shape memory wire 701 is only heated by a current provided by an authentication and control circuit; however, shape memory wire will contract regardless of the source of heating. Given the very small size and mass of the security device 700, a would-be attacker could easily apply a source of external heat which would eventually cause the shape memory wire 701 to contract through conduction from the exterior of the security device 700, thereby defeating the operation of security device 700. The security device 700 provides no fail safe feature to prevent unauthorized removal of the security device from the USB port by application of external heat.

Secondly, critical material selections and/or sufficient details for key mechanical components of the security device 700 are not disclosed. For example, a suitable material type for the lifting peg 705 is not disclosed. This is a critical material attribute since the actuation current applied to the shape memory wire 701 would be directly shorted to the USB metal shield tab if the lifting peg 705 was simply an extension of the spring metal lift arm 708 as is illustrated, or if the lifting peg 705 was constructed from an electrically conductive material. Direct shorting of the shape memory wire 701 actuation current would prevent adequate heating of the shape memory wire 701 thereby preventing the spring metal lift arm 708 from being moved from the locked condition.

Thirdly, a critical design characteristic of shape memory wire is that the amount of force produced by the shape memory wire is directly proportional to the length of the shape memory wire which can be heated. Since the inherent size of the security device is very small, the total length of the shape memory wire 701 contained in the security device 700 is extremely small. As such, those skilled in the art would easily recognize that the available force which could be produced by the shape memory wire 701 would be extremely small. Further, the geometry of the security device 700 demands that the shape memory wire 701 produce enough force to bend the spring metal lift arm 708 sufficiently for the locking teeth 702 to become disengaged from the USB tab shield holes. Those skilled in the art would realize that the thickness of the spring metal lift arm 708 would necessarily be very small. The small thickness of the spring metal lift arm 708 presents a severe security concern since the security device 700 could be forcibly removed from the USB port by brute force, through manual twisting or flexing. In fact, in U.S. Patent Application Publication No. 2015/0020189 A1, discussed separately and in detail below, a similar spring plate design is disclosed, but requires use of a manual push button to adequately deflect a spring plate, instead of relying on a very small piece of shape memory wire to accomplish the same operation.

The security and fundamental design deficiencies of the security device 700 may prevent the use of such a device in organizations having strict security policies.

FIG. 2 illustrates a cross-sectional view of a USB locking plug device disclosed by U.S. Patent Application Publication No. 2008/0041125 A1. Specifically, FIG. 2 illustrates a lock 200 with a housing 214, which can be inserted into a USB port. The lock 200 comprises a locking member 208 with protrusions 218. Typically, to lock the USB port 216, the lock 200 is inserted into the USB port 216 and the lock button 206 is linearly actuated by the user manually, to cause the protrusions 218 to engage with openings 222 in the USB port 216. The device is unlocked using a mechanical key (not illustrated) which is inserted through the rear opening on the lock button 206 and by pulling the housing 214 rearward in the direction of the lock button 206. As such, the lock 200 does not include any self-actuating locking or unlocking mechanisms and instead requires the user to both insert the lock 200 into the USB port 216 and to manually actuate the lock button 206 to engage the locking member 208. Similarly, the lock 200 requires the user to insert a mechanical key (not illustrated) to unlock and remove the lock 200 from the USB port 216. The lock 200 fails to provide adequate security for the USB port since matching, lost or counterfeit keys to unlock and remove the lock 200 via the rear opening on the lock button 206 could easily be obtained by unauthorized individuals. Furthermore, the lock 200 fails to provide a reliable means for detecting unauthorized access since the lock 200 could be removed using unsanctioned means and replaced after unauthorized data transfer without any physical evidence of tampering.

FIG. 3 illustrates a functional view of a mechanical locking mechanism disclosed by U.S. Patent Application Publication No. 2007/0132551 A1. Specifically, FIG. 3 illustrates a general mechanical device 300 which utilizes shape memory wire 351, 353 to position a horizontal rod 349 in a bilateral direction by rotation of piece 355 about pivot point 357. No specific application of this device 300 is provided although the patent application discloses the ability to use this device in a locking fashion by controlling the movement of piece 355 which contains grooves 359, 361 to allow the incremental movement of horizontal rod 349 in a ratcheting type fashion. Those skilled in the art will clearly recognize that this device 300, as well as others presented in U.S. Patent Application Publication No. 2007/0132551 A1, are wholly unsuitable for use in a computer I/O security device due to their large size and complexity.

FIG. 4 illustrates a security device for preventing access to a USB port or receptacle, as disclosed by U.S. Patent Application Publication No. 2015/0020189 A1. Specifically, FIG. 4 illustrates a security device 400, which can be installed into a USB port. The security device 400 consists of a push button 418 which directly contacts flexible leaf spring 416. Attached on the end of the flexible leaf spring 416, proximate to the USB port, are two locking teeth 408a, 408b which are sized to engage in the lower shield tab holes of a USB port. When the locking teeth 408a, 408b are engaged in the shield tab holes of the USB port, the security device 400 cannot be removed from the USB port. In order to disengage the locking teeth 408a, 408b from the USB port, the push button 418 must be manually depressed, which moves the flexible leaf spring 416 and the attached locking teeth 408a, 408b to the unlocked condition. Operation of the push button 418 is normally prevented by a mechanical lever 423 which physically blocks movement of the push button 418. The mechanical lever 423 can pivot to allow the push button 418 to be depressed, but is held into the locked position by a spring 422. In order to unlock the device, an authentication circuit (not pictured) energizes the coil of an electro-magnetic solenoid 424. Upon energizing the solenoid 424, the mechanical lever 423, which is made from a ferromagnetic material, is magnetically attracted to the solenoid 424. The magnetic attraction is sufficient to overcome the counter-force of the spring 422 and the mechanical lever 423 pivots such that the mechanical lever 423 no longer physically blocks movement of the push button 418. Once the mechanical lever 423 has pivoted sufficiently, the push button 418 can be manually depressed to move the flexible leaf spring 416 and the locking teeth 408a, 408b such that the locking teeth 408a, 408b are no longer engaged in the tab shield holes of the USB port.

While the mechanical security device 400 described in U.S. Patent Application Publication No. 2015/0020189 A1 provides a general solution for the problem of security for a computer I/O port, the design of the security device 400 contains fundamental design flaws and suffers from several severe security vulnerabilities.

Firstly, many USB ports can be located in components which have no immediate source of power. Also, USB port security devices may require installation on computers and other network machines which are in a powered off condition. This is a serious drawback since in order to install the security device 400 without risking damage to the mechanical locking mechanism, the security device 400 must first be unlocked, which requires an external source of power to energize the solenoid 424.

Secondly, to unlock the security device 400, the solenoid 424 must be energized such that is causes the mechanical lever 423 to pivot. Since the mechanical lever 423 is necessarily made from ferromagnetic material, it is highly susceptible to being influenced such that the device could be unlocked by a would-be attacker with a powerful handheld magnet or magnetic device. Further complicating this severe security concern is that the mechanical lever 423 is located on one edge of the security device 400 external the USB port when the security device 400 is fully inserted into the USB port. This unfortunate location offers no magnetic shielding of the mechanical lever 423.

Thirdly, the top cover 499 of the security device 400 necessarily contains a physical aperture for the push button 418. This aperture could be exploited by a would-be attacker by forcing a tool or small foreign object between the push button 418 and the top cover 499. The aperture location is unfortunate in this regard because insertion of a tool or foreign object into the aperture allows the tool or foreign object to make direct physical contact with the flexible leaf spring 416 bypassing the mechanical lever 423.

Fourthly, the security plug 413 located on the end of the security device 400 proximate to the USB port, mates with the internal USB plug (not illustrated) to establish an electrical connection between the security device 400 and the host computer (not illustrated). The security plug 413 contains one or more contact strips to make the electrical connection and therefore the security plug 413 would be necessarily made from some non-electrical conducting material (such as plastic) having very limited structural strength. The length of the security plug 413 is relatively short with respect to the length of the USB port and only supports the security device 400 when fully inserted into the USB port on one side. In fact, when the security device 400 is fully inserted into the USB port, the only support provided is from the relatively small sized locking teeth 408a, 408b and the security plug 413. This arrangement results in a weak structure having limited support thus creating a severe security concern in that the security device 400 could be forcibly removed from the USB port by a would-be attacker through bending and twisting of the handle of the security device 400 with relative ease.

The security and fundamental design deficiencies of the security device 400 may prevent the use of such a device in organizations having strict security policies since the mechanical portions of the locking device 400 could be easily defeated in a variety of ways.

FIG. 5 illustrates a plug for preventing access to a USB port as disclosed by PCT Application Publication No. WO2013/042108. Specifically, FIG. 5 illustrates a plug 500 which is configured to be inserted into a USB port (not illustrated) to block the USB port thereby preventing unauthorized access to the USB port. The plug 500 comprises a solid planar body portion 525 and a frangible tab 528 fixed to the planar body portion 525. The planar body portion 525 comprises first and second surfaces 525*a*, 525*b* separated by lateral sides 525*c*. The frangible tab 528 is typically fixed to a lateral side 525*c* of the planar body portion 525 that is not enclosed by the USB port when the planar body portion 525 is inserted into the USB port. The first and second surfaces 525*a*, 525*b* and the lateral sides 525*c* may be dimensioned such that a lateral side 525*c*, not enclosed by the USB port is flush with an outer edge of a USB port frame when the security plug 500 is fully inserted therein. The first surface 525*a* of the planar body 525 may comprise at least one prong 524 for engaging a corresponding aperture in the USB port frame, wherein an edge of the USB port aperture engages the prong 524 and impedes removal of the plug 500 from the USB port. The frangible tab 528 of the plug 500 may be adapted for easy withdrawal of an inserted plug 500; however, the frangible tab 528 may also be configured to fracture/detach from the body portion when withdrawal of the plug 500 from the USB port is attempted, leaving a tell-tale fracture mark. Detachment of frangible tab 528 may impede removal of the plug 500 once it is inserted into the USB port and may also provide an immediate visual indication that the plug 500 has been tampered with.

Although the design of the plug 500 attempts to provide a rudimentary, albeit inadequate, solution to blocking access to a USB port, the plug 500 does not prevent an unauthorized individual from removing the plug 500 with brute force, with or without damaging the plug 500. Therefore, the plug 500 lacks a positive locking mechanism. Furthermore, blocking the USB port with the plug 500 does not provide any means for an authorized individual to use the port when necessary without damaging the plug 500 and/or the USB port itself. In addition, inadvertent bumping or excessive unintended physical contact with the frangible tab 528 could result in fracture of the tab 528 and a false tampering indication. This drawback necessitates frequent replacement of the plug 500, thereby severely limiting its usage in practical applications.

FIG. 6 illustrates a security device for preventing access to a USB port or receptacle, as disclosed by U.S. Pat. No. 9,460,319 B1. Specifically, FIG. 6 illustrates a security device 600 which is configured to be inserted into a USB port 608 to block the USB port 608 in an attempt to prevent unauthorized access to the USB port 608. U.S. Pat. No. 9,460,319 B1 also discloses similar devices for RJ-45 and serial ports, but the operation of the mechanical locking device for the RJ-45 and the serial port security devices are essentially the same as depicted in FIG. 6. The security device 600 is locked into the USB port 608 by locking arms 605, which physically engage in the USB port 608 lower shield tab holes. The locking arms 605 are attached to an axle 604 which is adapted to rotate in two opposite directions. As viewed in FIG. 6, when the axle 604 rotates in the counter-clockwise direction, the locking arms 605 become engaged in the USB port 608 lower shield tab holes, which prevents the security device 600 from being removed from the USB port 608. As viewed in FIG. 6, when the axle 604 rotates in the clockwise direction, the locking arms 605 disengage from the USB Port 608 lower shield tab holes, allowing the security device 600 to be removed from the USB port 608. Movement of the axle 604 is performed by an electro-mechanical device 601 and a mechanical linkage consisting of a shaft 607 and a link pin 606. Movement of the shaft 607 in the axial direction exerts force on the link pin 606 which creates a torsional moment between the link pin 606 and the rotational axis of the axle 604, causing the axle 604 to rotate. The electro-mechanical device 601 consists of either a solenoid, a micro-stepper motor or a piezo-electric motor, which are all capable of moving the shaft 607 in both axial directions. Power and control signals to operate the electro-mechanical device 601 is provided by a control cable 603 which connects the electro-mechanical device 601 to a controller card 602. To engage the security device 600 into the USB port 608, the electro-mechanical device 601 must be energized such that the shaft 607 positions the axle 604 and locking arm 605 to the unlocked condition. The security device 600 can then be manually inserted into the USB port 608. After installation of the security device 600 into the USB port 608, the electro-mechanical device 601 must again be energized such that the shaft 607 positions the axle 604 and locking arm 605 to the locked condition.

While the security device 600 described in U.S. Pat. No. 9,460,319 B1 provides a general solution for the problem of security for a computer I/O port, the design of the security device 600 has critical design flaws and suffers from several severe security vulnerabilities and operational limitations.

Firstly, many I/O ports can be located in components which have no immediate source of power. Also, I/O port security devices often require installation on computers and other network machines which are in a powered off condition. As with many other prior-art devices, this is a serious drawback since in order to install the security device 600, the security device 600 must first be unlocked to position the locking arm 605 to the unlocked condition, then after manual insertion of the security device 600 into the I/O port, the locking arm 605 must be positioned to the locked condition. Both of these operations require an external source of power.

Secondly, if the electro-mechanical device 601 is a solenoid, the shaft 607 must be made from a ferromagnetic material which would be highly susceptible to being influenced such that the device could be unlocked by a would-be attacker with a powerful handheld magnet or magnetic device. Further complicating this severe security concern is that the mechanical linkage is located on the bottom edge of the security device 600 external the USB port 608 when the security device 600 is fully inserted into the USB port 608. This unfortunate location offers no magnetic shielding of the shaft 607. The general location of the shaft 607 for the RJ-45 and serial port security devices is similar to the location of the shaft 607 depicted in FIG. 6 and suffers from the same vulnerability.

Thirdly, use of micro-piezoelectric motors or micro-stepper motors as the electro-mechanical device 601 requires use of a controller circuit in order to control important functional parameters such as motor speed, motor direction and duration of motor operation. In the event of a software or hardware fault in the controller card, these types of electro-mechanical device 601 will fail at whatever position the controller fault occurred. This creates a grave security vulnerability in that the security device 600 utilizing either a micro-piezoelectric motor or a micro-stepper motor offers no "fail-safe" feature to keep the security device 600 in the locked condition if a controller fault occurs.

In summary, any choice of electro-mechanical device 601 (either solenoid, micro-stepper motor or micro-piezoelectric motor) used in the security device 600 presents very dire security concerns. The security and functional design deficiencies of the security device 600 may prevent the use of such a device in organizations having strict security policies.

FIG. 7*a* schematically illustrates an orthographic projection of a mechanical locking device 100 according to an exemplary embodiment of the present invention suitable for use in multiple USB port security devices to be described hereinafter. The mechanical locking device 100 consists of an axle 2 that is supported on two sides by support plates 4*a*, 4*b*, allowing the axle to rotate in the engaged direction AA, or the disengaged direction BB. The support plates 4*a*, 4*b* are physically attached to a bottom side 11*b* of a casing 11, which is discussed in more detail hereinafter and is illustrated in FIG. 7*c*.

Attached to the axle 2 are two locking arms 3*a*, 3*b* which rotate along with the axle 2. The locking arms 3*a*, 3*b* are sized to be received within the lower shield tab holes of a USB port through apertures 7*a*, 7*b*. As long as the locking arms 3*a*, 3*b* are engaged in the USB lower shield tab holes, a USB port security device which contains the mechanical locking device 100 cannot be removed from the USB port.

In some embodiments, the axle 2, support plates 4*a*, 4*b* and locking arms 3*a*, 3*b* are fabricated from metal. In other embodiments, the axle 2, support plates 4*a*, 4*b* and locking arms 3*a*, 3*b* are fabricated from non-metallic material, or any combination of metallic or non-metallic materials.

In some embodiments, the axle 2 and locking arms 3*a*, 3*b* are formed from separate pieces. In other embodiments, the axle 2 and locking arms 3*a*, 3*b* are formed from a single piece.

In some embodiments, the axle 2 and locking arms 3*a*, 3*b* are formed from non-magnetic material so as to be immune from physical movement by external magnetic devices.

An upper side of the axle 2 contains an upper attachment pin 6. An insulating coupling 5 is attached to the upper attachment pin 6 via a vertically oriented hole in a forward side of the insulating coupling 5 proximate the upper attachment pin 6. The insulating coupling 5 also contains a horizontally oriented hole in a rearward edge through which passes a shape memory wire 1. The shape memory wire 1, referred to herein as the "primary wire," has two free ends which are attached to electrical pins 8*a*, 8*b* suitable for mounting in a printed circuit board (not illustrated). Thusly, electrical pins 8*a*, 8*b* and the primary wire 1 form a complete electrical circuit which is protected from a short circuit to adjacent metal components of the mechanical locking device 100 by the insulating coupling 5.

Application of a DC voltage across electrical pins 8*a*, 8*b* causes a DC electrical current flow through the primary wire 1, causing it to heat up through joule heating. When sufficient heating of the primary wire 1 has occurred, it will contract, creating a torsional moment on the upper attachment pin 6 about the rotational axis 2*a* of the axle 2. The direction of the torsional moment produced by the heating of the primary wire 1 will cause the axle 2 to rotate in the disengaged direction BB. Upon termination of the DC current, the primary wire 1 will cool due to natural convection and conduction returning to its original length.

As mentioned previously, the amount of actuation force provided by the primary wire 1 is proportional to the length of primary wire 1 which can be heated. Utilization of an axle 2 which can rotate in the two support plates 4*a*, 4*b* offers the advantage of requiring a minimal amount of force to cause the axle 2 to rotate. This configuration is necessary since the relative size of the mechanical locking device 100 is small, which in turn limits the length of the primary wire 1 available for heating.

FIG. 7*b* schematically illustrates an orthographic projection of the mechanical locking device 100 which illustrates additional components not visible in FIG. 7*a*. A spring attachment pin 16 is attached to the bottom side of the axle 2 and accepts one free end of a coil spring 17. The other free end of the coil spring 17 is attached to a spring anchor tab 18. The spring anchor tab 18 is attached to the bottom side of the casing 11*b*. The coil spring 17 provides a constant bias on the axle 2 in the locked direction AA, by creating a constant torsional moment on the spring attachment pin 16 about the rotational axis 2*a* of the axle 2. As such, when no electrical current is being applied to the primary wire 1, the locking arms 3*a*, 3*b* are maintained in the locked condition. This arrangement accomplishes two objectives: 1) it allows the mechanical locking device 100 to be installed in a USB port without the need of external power; and 2) it provides a "fail-safe" design if the primary wire 1 breaks, or for some reason the primary wire 1 cannot be powered due to an electrical fault in the power supply, whereby the axle 2 and locking arms 3*a*, 3*b* will remain in the locked (safe) condition.

In some embodiments, a secondary attachment pin 21 is located on the bottom side of the axle 2 adjacent to the spring attachment pin 16. Attached to the secondary attachment pin 21 is the free end of a second piece of shape memory wire 19, referred to herein as the "secondary wire." The other free end of the secondary wire 19 is attached to a base lug 20. The base lug 20 is attached to the bottom side of the casing 11*b*. The chosen properties of the secondary wire 19 differ from the primary wire 1 in two ways: 1) the activation temperature for the secondary wire 19 is lower than the activation temperature for the primary wire 1; and 2) the actuation force of the secondary wire 19 is greater than the actuation force of the primary wire 1. If a sufficient source of external heat is applied to the mechanical locking device 100, the primary wire 1 will contract, thus applying a torsional moment on the axle 2 in the disengaged direction BB as described above. However, the heat will simultaneously cause the secondary wire 19 to also contract, which will provide a counter-torsional moment in engaged direction AA on the secondary attachment pin 21 about the rotation axis 2*a* of the axle 2. Since the secondary wire 19 is selected to produce a greater activation force, the axle 2 would remain in the locked condition. This arrangement ensures the mechanical locking device 100 remains in the locked condition due to the application of external heat to the mechanical locking device 100 by a would-be attacker.

Typically, the upper attachment pin 6 is made of standard metal alloys; however, in some embodiments, the upper attachment pin 6 is made from a special metal alloy having a low melting point. Similar metal alloys are often used as fusible links in mechanical safety systems and fire protection systems, whereby careful variation of the alloy composition allows the desired melting temperature to be achieved. If a sufficient source of external heat is applied to the mechanical locking device 100, the melting point of the upper attachment pin 6 is established such that upper attachment pin 6 will melt before the external heating activated the primary wire 1. Melting of the upper attachment pin 6 would result in the removal of the upper attachment pin 6 from the axle 2 which would permanently prevent movement of the axle 2 by heating of the primary wire 1. The spring attachment pin 16, the coil spring 17 and the spring anchor tab 18, unaffected by the application of external heat, would maintain the axle 2 biased in the engaged direction AA. This arrangement provides another method to ensure the mechanical locking device 100 remains in the locked condition due to the application of external heat to the mechanical locking device 100 by a would-be attacker.

FIG. 7c schematically illustrates an orthographic projection of the mechanical locking device 100 which illustrates additional components not visible in FIG. 7a or FIG. 7b. A casing 11, with sides 11a, 11b, 11c, 11d, 11e, 11f, encloses the mechanical locking device 100. The casing 11 is closed on all sides except the front side 11a facing the USB port, thereby allowing the internal volume of the USB port (not illustrated) to accept the casing 11 holding the mechanical security device 100. The bottom side 11b of the casing 11 provides a structural base for the support plates 4a, 4b, the spring anchor tab 18 and the base lug 20 illustrated in FIGS. 7a and 7b. The casing 11 proximate to the USB port is of sufficient length that when inserted into the USB port it substantially occupies most of the available internal volume of the USB port, thereby providing significant structural support for the top 11c, bottom 11b and lateral sides 11e, 11f of the casing 11 and the mechanical locking device 100 contained therein.

The casing 11 is sized such that when fully inserted into the USB port, no substantial gaps between any side of the casing 11 and the USB port opening exist, thereby preventing a would-be attacker from inserting a tool or foreign object between the casing 11 and the USB port opening.

The casing 11 contains apertures 7a, 7b which allow the locking arms 3a, 3b (not illustrated) to extend into the USB port lower shield tab holes. Apertures 7a, 7b are located within the internal volume of the USB port when the casing 11 is fully inserted into the USB port and are not physically accessible when the casing 11 is fully inserted.

In some embodiments, one or more additional apertures 7c or 7d may be provided in the casing 11 to allow attachment of electronic cables (for example, micro ports) for security purposes and for supplying a source of DC voltage to the electrical pins 8a, 8b (not illustrated). In other embodiments, apertures 7c or 7d may not be provided. Other than apertures 7c or 7d, no other openings in the casing 11 external to the USB port are provided, thereby making the casing 11 a contiguous shell with no chance of being physically breeched by a tool or foreign object, device or the like.

In some embodiments, the casing 11 may be made of metal. In other embodiments, the casing 11 may consist of an outer metal shell lined internally or externally with a low conductivity material thus providing a thermal insulation boundary for the primary wire 1 contained within. In still other embodiments, the casing 11 may be made from non-metallic materials such as high strength plastic, or indeed any combination of metallic and non-metallic materials.

FIG. 8a schematically illustrates an orthographic projection of a mechanical locking device 101 according to an exemplary embodiment of the present invention suitable for use in multiple USB port security devices to be described hereinafter. The mechanical locking device 101 consists of an axle 2 that is supported on two sides by support plates 4a, 4b, allowing the axle to rotate in the engaged direction AA, or the disengaged direction BB. The support plates 4a, 4b are physically attached to a bottom side 11b of a casing 11, which is discussed in more detail hereinafter and is illustrated in FIG. 8c.

In this embodiment, the mechanical locking device 101 utilizes a single locking plate 9 instead of two locking arms 3a, 3b, as illustrated in FIG. 7a.

The locking plate 9 is attached to the axle 2, and rotates along with the axle 2. Two locking tabs 9a, 9b are formed from the ends of the locking plate 9, proximate to apertures 7a, 7b, and are sized to be received within the USB lower shield tab holes. As long as the locking tabs 9a, 9b are engaged in the USB lower shield tab holes, the USB port security device which contains the mechanical locking device 101 cannot be removed from the USB port.

In some embodiments, the locking plate 9 and axle 2 are two separate pieces which are joined together. In other embodiments the locking plate 9 and the axle 2 are formed from a single piece.

The purposes and functions of the axle 2, support plates 4a, 4b, primary wire 1, electrical pins 8a, 8b, upper attachment pin 6 and insulating coupling 5 are the same as described in relation to FIG. 7a.

In some embodiments, the axle 2, support plates 4a, 4b, locking plate 9 and locking tabs 9a, 9b are fabricated from metal. In other embodiments, the axle 2, support plates 4a, 4b, locking plate 9 and locking tabs 9a, 9b are fabricated from non-metallic material, or in any combination of metallic or non-metallic materials.

In some embodiments, the axle 2, the locking plate 9 and the locking tabs 9a, 9b are formed from non-magnetic material so as to be immune from physical movement by external magnetic devices.

FIG. 8b schematically illustrates an orthographic projection of the mechanical locking device 101 which illustrates additional components not visible in FIG. 8a.

In some embodiments, a spring attachment pin 16, coil spring 17, spring anchor tab 18, secondary attachment pin 21, secondary wire 19 and base lug 20 are provided, as previously described.

The purposes and functions of the spring attachment pin 16, the coil spring 17, the spring anchor tab 18, the secondary attachment pin 21, the secondary wire 19 and the base lug 20 are the same as described in relation to FIG. 7b.

In some embodiments, the upper attachment pin 6 is made of standard metal alloys; however, in some embodiments, the upper attachment pin 6 is made from a low melting point metal alloy for the same reasons as discussed in relation to FIG. 7b.

FIG. 8c schematically illustrates an orthographic projection of the mechanical locking device 101 which illustrates additional components not visible in FIG. 8a or FIG. 8b.

The purposes and functions of the casing 11, with casing sides 11a, 11b, 11c, 11d, 11e, 11f and apertures 7a, 7b are the same as discussed in relation to FIG. 7c.

In some embodiments, one or more additional apertures 7c or 7d may be provided in the casing 11 to allow attachment of electronic cables (for example, micro ports) for security purposes and for supplying a source of DC voltage to the electrical pins 8a, 8b. In other embodiments, apertures 7c or 7d may not be provided. Other than apertures 7c or 7d, no other openings in the casing 11 external to the USB port are provided, thereby making the casing 11 a contiguous shell with no chance of being physically breeched by a tool or foreign object, device or the like.

In some embodiments, the casing 11 may be made of metal. In other embodiments, the casing 11 may consist of an outer metal shell lined, internally or externally, with a low conductivity material thus providing a thermal insulation boundary for the primary wire 1 contained within. In still other embodiments, the casing 11 may be made from non-metallic materials such as high strength plastic, or indeed any combination of metallic and non-metallic materials.

FIG. 9a schematically illustrates an orthographic projection of a mechanical locking device 102 according to an exemplary embodiment of the present invention suitable for use in RJ-45 port security devices to be described hereinafter. The mechanical locking device 102 consists of an axle 2 that is supported on two sides by support plates 4a, 4b, allowing the axle to rotate in the engaged direction AA, or the disengaged direction BB. The support plates 4a, 4b are physically attached to a bottom side 12b of a casing 12, which is discussed in more detail hereinafter and is illustrated on FIG. 9c.

In this embodiment, the mechanical locking device 102 utilizes a single locking plate 10 instead of multiple locking arms 3a, 3b as illustrated in FIG. 7a, or locking tabs 9a, 9b as illustrated in FIG. 8a.

The locking plate 10 is attached to the axle 2, and rotates along with the axle 2. The locking plate 10, proximate to aperture 13a, is sized to be received within an RJ-45 port opening gap, just inside an RJ-45 port opening. The aperture 13a is sized to allow the bottom edge of the locking plate 10 to engage in the gap of a RJ-45 port just inside the RJ-45 port opening. As long as the locking plate 10 is engaged in the RJ-45 port, the RJ-45 port security device which contains the mechanical locking device 102, cannot be removed from the RJ-45 port.

In some embodiments, the locking plate 10 and axle 2 are two separate pieces which are joined together. In other embodiments the locking plate 10 and the axle 2 are formed from a single piece.

In some embodiments, the axle 2, support plates 4a, 4b and locking plate 10 are fabricated from metal. In other embodiments, the axle 2, support plates 4a, 4b and locking plate 10 are fabricated from non-metallic material, or in any combination of metallic or non-metallic materials.

In some embodiments, the axle 2 and locking plate 10 are formed from non-magnetic material so as to be immune from physical movement by external magnetic devices.

The purposes and functions of the axle 2, support plates 4a, 4b, primary wire 1, electrical pins 8a, 8b, upper attachment pin 6 and insulating coupling 5 are the same as described in relation to FIG. 7a.

FIG. 9b schematically illustrates an orthographic projection of the mechanical locking device 102 which illustrates additional components not visible in FIG. 9a.

In some embodiments, a spring attachment pin 16, coil spring 17, spring anchor tab 18, secondary attachment pin 21, secondary wire 19 and base lug 20 are provided, as previously described.

The purposes and functions of the spring attachment pin 16, the coil spring 17, the spring anchor tab 18, the secondary attachment pin 21, the secondary wire 19 and the base lug 20 are the same as described in relation to FIG. 7b.

In some embodiments, the upper attachment pin 6 is made of standard metal alloys; however, in some embodiments, the upper attachment pin 6 is made from a low melting point metal alloy for the same reasons as discussed in relation to FIG. 7b.

FIG. 9c schematically illustrates an orthographic projection of the mechanical locking device 102 which illustrates additional components not visible in FIG. 9a or FIG. 9b.

A casing 12, with sides 12a, 12b, 12c, 12d, 12e, 12f, encloses the mechanical locking device 102. The casing 12 is closed on all sides except the front side 12a facing the RJ-45 port, thereby allowing the internal volume of the RJ-45 port to accept the casing 12 holding the mechanical security device 102. The bottom side 12b of the casing 12 provides a structural base for the support plates 4a, 4b, the spring anchor tab 18 and the base lug 20. The casing 12 proximate to the RJ-45 port is of sufficient length that when inserted into the RJ-45 port it substantially occupies most of the available internal volume of the RJ-45 port, thereby providing significant structural support for the top 12c, bottom 12b and lateral sides 12e, 12f of the casing 12 and the mechanical locking device 102 contained therein.

The casing 12 is sized such that when fully inserted into the RJ-45 port, no substantial gaps between any side of the casing 12 and the RJ-45 port opening exist, thereby preventing a would-be attacker from inserting a tool or foreign object between the casing 12 and the RJ-45 port opening.

The casing 12 contains aperture 13a which allows the locking plate 10 to extend into the RJ-45 port opening. Aperture 13a is located within the internal volume of the RJ-45 port when the casing 12 is fully inserted into the RJ-45 port and is not physically accessible when the casing 12 is fully inserted.

In some embodiments, one or more additional apertures 13b may be provided in the casing 12 to allow attachment of electronic cables (for example, micro ports) for security purposes and for supplying a source of DC voltage to the electrical pins 8a, 8b. In other embodiments, aperture 13b may not be provided. Other than aperture 13b, no other openings in the casing 12 external to the RJ-45 port are provided, thereby making the casing 12 a contiguous shell with no chance of being physically breeched by a tool or foreign object, device or the like.

In some embodiments, the casing 12 may be made of metal. In other embodiments, the casing 12 may consist of an outer metal shell lined, internally or externally, with a low conductivity material thus providing a thermal insulation boundary for the primary wire 1 contained within. In still other embodiments, the casing 12 may be made from non-metallic materials such as high strength plastic, or indeed any combination of metallic and non-metallic materials.

FIG. 10a schematically illustrates an orthographic projection of a mechanical locking device 103 according to an exemplary embodiment of the present invention suitable for use in a serial port security device to be described hereinafter. The mechanical locking device 103 consists of an axle 2 that is supported on two sides by support plates 4a, 4b, allowing the axle to rotate in the engaged direction AA, or the disengaged direction BB. The support plates 4a, 4b are physically attached to a bottom side 14b of a casing 14, which is discussed in more detail hereinafter and is illustrated on FIG. 10c.

In this embodiment, the mechanical locking device 103 utilizes a single locking plate 10 as illustrated in FIG. 10a.

The locking plate 10 is attached to the axle 2, and rotates along with the axle 2. The locking plate 10 is sized to engage in a locking bar 53 which is physically attached to a serial port connection. As long as the locking plate 10 is engaged forward of the locking bar 53, the serial port security device which contains the mechanical locking device 103, cannot be removed from the serial port.

In some embodiments, the locking plate 10 and axle 2 are two separate pieces which are joined together. In other embodiments the locking plate 10 and the axle 2 are formed from a single piece.

In some embodiments, the axle 2, support plates 4a, 4b and locking plate 10 are fabricated from metal. In other embodiments, the axle 2, support plates 4a, 4b and locking plate 10 are fabricated from non-metallic material, or in any combination of metallic or non-metallic materials.

In some embodiments, the axle 2 and locking plate 10 are formed from non-magnetic material so as to be immune from physical movement by external magnetic devices.

The purposes and functions of the axle 2, support plates 4a, 4b, primary wire 1, electrical pins 8a, 8b, upper attachment pin 6 and insulating coupling 5 are the same as described in relation to FIG. 7a.

FIG. 10b schematically illustrates an orthographic projection of the mechanical locking device 103 which illustrates additional components not visible in FIG. 10a.

In some embodiments, a spring attachment pin 16, coil spring 17, spring anchor tab 18, secondary attachment pin 21, secondary wire 19 and base lug 20 are provided, as previously described.

The purposes and functions of the spring attachment pin 16, the coil spring 17, the spring anchor tab 18, the secondary attachment pin 21, the secondary wire 19 and the base lug 20 are the same as described in relation to FIG. 7b.

In some embodiments, the upper attachment pin 6 is made of standard metal alloys; however, in some embodiments, the upper attachment pin 6 is made from a low melting point metal alloy for the same reasons as discussed in relation to FIG. 7b.

FIG. 10c schematically illustrates an orthographic projection of the mechanical locking device 103 which illustrates additional components not visible in FIG. 10a or FIG. 10b.

A casing 14, with sides 14a, 14b, 14c, 14d, 14e, 14f, encloses the mechanical locking device 103. The casing 14 is closed on all sides except the front side 14a facing the serial port. The bottom side 14b of the casing 14 provides a structural base for the support plates 4a, 4b, the spring anchor tab 18 and the base lug 20.

The casing 14 is sized such that when the locking plate 10 is engaged forward of the serial port locking bar 53, no substantial gaps between any side of the casing 14 and the serial port opening exist, thereby preventing a would-be attacker from inserting a tool or foreign object between the casing 14 and the face of the serial port (see, e.g., FIG. 15a and FIG. 15b).

In some embodiments, one or more additional apertures 15 may be provided in the casing 14 to allow attachment of electronic cables (for example, micro ports) for security purposes and for supplying a source of DC voltage to the electrical pins 8a, 8b. In other embodiments, the aperture(s) 15 may not be provided. Other than aperture(s) 15, no other openings in the casing 14 are provided, thereby making the casing 14 a contiguous shell with no chance of being physically breeched by a tool or foreign object, device or the like.

In some embodiments, the casing 14 may be made of metal. In other embodiments, the casing 14 may consist of an outer metal shell lined, internally or externally, with a low conductivity material thus providing a thermal insulation boundary for the primary wire 1 contained within. In still other embodiments, the casing 14 may be made from non-metallic materials such as high strength plastic, or indeed any combination of metallic and non-metallic materials.

FIG. 11a schematically illustrates an orthographic projection of a mechanical locking device 104 according to an exemplary embodiment of the present invention suitable for use in a locking portable storage device, and in particular a locking flash drive, for a USB port. The mechanical locking device 104 consists of an axle 2 that is supported on two sides by support plates 4a, 4b, allowing the axle to rotate in the engaged direction AA, or the disengaged direction BB.

The support plates 4a, 4b are physically attached to a bottom side 62b of a casing 62, which is discussed in more detail hereinafter and is illustrated in FIG. 11c.

In this embodiment, the mechanical locking device 104 utilizes two locking arms 3a, 3b; however, in other embodiments a single locking plate 9 and locking tabs 9a, 9b as illustrated in FIG. 8a are used.

The locking arms 3a, 3b are attached to the axle 2, rotate along with the axle 2 and are sized to be received within the USB lower shield tab holes through apertures 7a, 7b. As long as the locking arms 3a, 3b are engaged in the USB lower shield tab holes, the USB flash drive which contains the mechanical locking device 104, cannot be removed from the USB port.

In some embodiments in which the locking arms 3a, 3b are utilized, the locking arms 3a, 3b and axle 2 are two separate pieces which are joined together. In other embodiments, locking arms 3a, 3b and the axle 2 are formed from a single piece.

In some embodiments, in which the locking arms 3a, 3b are utilized, the axle 2, support plates 4a, 4b and locking arms 3a, 3b are fabricated from metal. In other embodiments, the axle 2, support plates 4a, 4b and locking arms 3a, 3b are fabricated from non-metallic material, or in any combination of metallic or non-metallic materials.

In some embodiments, the axle 2 and locking arms 3a, 3b are formed from non-magnetic material so as to be immune from physical movement by external magnetic devices.

In some embodiments in which the locking plate 9 and locking tabs 9a, 9b are utilized, the locking plate 9 and axle 2 are two separate pieces which are joined together. In other embodiments the locking plate 9 and the axle 2 are formed from a single piece.

In some embodiments, in which the locking plate 9 and locking tabs 9a, 9b are utilized, the axle 2, support plates 4a, 4b, locking plate 9 and locking tabs 9a, 9b are fabricated from metal. In other embodiments, the axle 2, support plates 4a, 4b, locking plate 9 and locking tabs 9a, 9b are fabricated from non-metallic material, or in any combination of metallic or non-metallic materials.

In some embodiments, the axle 2, locking plate 9 and locking tabs 9a, 9b are formed from non-magnetic material so as to be immune from physical movement by external magnetic devices.

The purposes and functions of the axle 2, support plates 4a, 4b, primary wire 1, electrical pins 8a, 8b, upper attachment pin 6 and insulating coupling 5 are the same as described in relation to FIG. 7a.

FIG. 11b schematically illustrates an orthographic projection of the mechanical locking device 104 which illustrates additional components not visible in FIG. 11a.

In some embodiments, a spring attachment pin 16, coil spring 17, spring anchor tab 18, secondary attachment pin 21, secondary wire 19 and base lug 20 are provided, as previously described.

The purposes and functions of the spring attachment pin 16, the coil spring 17, the spring anchor tab 18, the secondary attachment pin 21, the secondary wire 19 and the base lug 20 are the same as described in relation to FIG. 7b.

In some embodiments, the upper attachment pin 6 is made of standard metal alloys; however, in some embodiments, the upper attachment pin 6 is made from a low melting point metal alloy for the same reasons as discussed in relation to FIG. 7b.

FIG. 11c schematically illustrates an orthographic projection of the mechanical locking device 104 which illustrates additional components not visible in FIG. 11a or FIG. 11b.

A casing 62, with sides 62a, 62b, 62c, 62d, 62e, 62f, enclose the mechanical locking device 104. The casing 62 is closed on all sides except the front side 62a facing the USB port, thereby allowing the internal volume of the USB port to accept the casing 62 holding the mechanical security device 104. The bottom side 62b of the casing 62 provides a structural base for the support plates 4a, 4b, the spring anchor tab 18 and the base lug 20 illustrated in FIGS. 11a and 11b. The casing 62 proximate to the USB port is of sufficient length that when inserted into the USB port it substantially occupies most of the available internal volume of the USB port, thereby providing significant structural support for the top 62c, bottom 62b and lateral sides 62e, 62f of the casing 62 and the mechanical locking device 104 contained therein.

The casing 62 is sized such that when fully inserted into the USB port, no substantial gaps between any side of the casing 62 and the USB port opening exist, thereby preventing a would-be attacker from inserting a tool or foreign object, device or the like between the casing 62 and the USB port opening.

The casing 62 contains apertures 7a, 7b which allow the locking arms 3a, 3b or the locking tabs 9a, 9b to extend into the USB port lower shield tab holes. Apertures 7a, 7b are located within the internal volume of the USB port when the casing 62 is fully inserted into the USB port and are not physically accessible when the casing 62 is fully inserted.

In some embodiments, an aperture 63 may be provided in the casing 62 to allow attachment of electronic cables (for example, micro ports) for security purposes and for supplying a source of DC voltage to the electrical pins 8a, 8b. In other embodiments, aperture 63 may not be provided. Other than aperture 63, no other openings in the casing 62 external to the USB port are provided, thereby making the casing 62 a contiguous shell with no chance of being physically breeched by a tool or foreign object, device or the like.

In some embodiments, the casing 62 may be made of metal. In other embodiments, the casing 62 may consist of an outer metal shell lined, internally or externally, with a low conductivity material thus providing a thermal insulation boundary for the primary wire 1 contained within. In still other embodiments, the casing 62 may be made from non-metallic materials such as high strength plastic, or indeed any combination of metallic and non-metallic materials.

FIG. 12a illustrates a top, cut-away view of a USB port security device which contains the mechanical locking device 100 according to an exemplary embodiment of the present invention. In FIG. 11a, the port security device illustrated could be used as a USB port locking device. In this application, the mechanical locking device 100 ensures the USB port blocking device cannot be physically removed from the USB port until the mechanical locking device 100 is unlocked. The functions and purposes of the mechanical locking device 100 and all associated sub-components including the primary wire 1, axle 2, locking arms 3a, 3b, support plates 4a, 4b, insulating coupling 5, upper attachment pin 6, electrical pins 8a, 8b, locking plate 9, locking tabs 9a, 9b, casing 11, spring attachment pin 16, coil spring 17, spring anchor tab 18, secondary wire 19, base lug 20 and secondary attachment pin 21 are as previously described in relation to FIG. 7a, FIG. 7b, FIG. 7c and FIG. 8a.

In this embodiment, locking arms 3a, 3b are illustrated with the locking arms 3a, 3b engaged in the USB port lower shield tab holes 31a, 31b; however, use of a locking plate 9 and locking tabs 9a, 9b as illustrated in FIG. 8a would function similarly.

The casing 11 is accepted by the internal volume of the USB port 30 and shows how those portions of the casing sides 11b, 11c, 11e and 11f located internal to the interior of the USB port are well supported by the internal sides of the USB port.

In this embodiment, aperture 7d is provided in the rear side 11d of the casing 11 allowing for the use of a micro port 39, which could be used to provide power and security control signals to a printed circuit board 40 (see FIG. 12b) from an external source.

In this embodiment, a USB cable connector 34, which makes electrical contact with the contact strips 33 of the USB port connector internal to the USB port, is shown. The USB cable connector 34 can then provide power and security control signals to the printed circuit board 40 (see FIG. 12b) from the host device via control cable 32.

In this embodiment, electrical pins 8a, 8b are directly attached to the printed circuit board 40 (see FIG. 12b) to provide a source of DC voltage to the primary wire 1.

FIG. 12b illustrates a side, cut-away view of the mechanical locking device 100 and how the mechanical locking device 100 could be physically configured in a USB port security device as described in FIG. 12a.

FIG. 13a illustrates a top, cut-away view of a USB port security device which contains the mechanical locking device 101 according to an exemplary embodiment of the present invention. In FIG. 13a, the port security device illustrated could be used as a USB port monitoring device to which peripheral devices having a male USB connector could be monitored while the USB port is in use. In this application, the mechanical locking device 101 ensures the USB port monitoring device cannot be physically removed from the USB port until the mechanical locking device 101 is unlocked. The functions and purposes of the mechanical locking device 101 and all associated sub-components including the primary wire 1, axle 2, locking arms 3a, 3b, support plates 4a, 4b, insulating coupling 5, upper attachment pin 6, electrical pins 8a, 8b, locking plate 9, locking tabs 9a, 9b, casing 11, spring attachment pin 16, coil spring 17, spring anchor tab 18, secondary wire 19, base lug 20 and secondary attachment pin 21 are as previously described in relation to FIG. 7a, FIG. 7b, FIG. 7c and FIG. 8a.

In this embodiment, locking arms 3a, 3b are illustrated with the locking arms 3a, 3b engaged in the USB port lower shield tab holes 31a, 31b; however, use of a locking plate 9 and locking tabs 9a, 9b as illustrated in FIG. 8a would function similarly.

The casing 11 is accepted by the internal volume of the USB port 30 and shows how those portions of the casing sides 11b, 11c, 11e and 11f located internal to the interior of the USB port are well supported by the internal sides of the USB port.

In this embodiment, aperture 7c is provided in the lateral side 11e of the casing 11 allowing for the use of a micro-port 39, which could be used to provide power and security control signals to a printed circuit board 40 (see FIG. 13b) from an external source.

In this embodiment, a USB cable connector 34, which makes electrical contact with the contact strips 33 of the USB port 30 internal to the USB port 30, is shown. The USB cable connector 34 can then provide power and security control signals to the printed circuit board 40 (see FIG. 13b) from the host device via control cable 32.

In this embodiment, a second USB port 36 with electrical contact strips 38 are provided in the USB security device to accept peripheral components that can be monitored by authentication or security software. A second USB cable connector 37 and a second control cable 35 provide control signals and power to the printed circuit board 40 (see FIG. 13b).

In this embodiment, electrical pins 8a, 8b are directly attached to the printed circuit board 40 (see FIG. 13b) to provide a source of DC voltage to the primary wire 1.

FIG. 13b illustrates a side, cut-away view of the mechanical locking device 101 and how the mechanical locking device 101 could be physically configured in a USB port security device as described in FIG. 13a.

FIG. 14a illustrates a top, cut-away view of a RJ-45 port security device which contains the mechanical locking device 102 according to an exemplary embodiment of the present invention. In FIG. 14a, the port security device illustrated could be used as a RJ-45 port locking device. In this application, the mechanical locking device 102 ensures the RJ-45 port security device cannot be physically removed from the RJ-45 port until the mechanical locking device 102 is unlocked. The functions and purposes of the mechanical locking device 102 and all associated sub-components including the primary wire 1, axle 2, support plates 4a, 4b, insulating coupling 5, upper attachment pin 6, electrical pins 8a, 8b, locking plate 10, casing 12, spring attachment pin 16, coil spring 17, spring anchor tab 18, secondary wire 19, base lug 20 and secondary attachment pin 21 are as previously described in relation to FIG. 9a, FIG. 9b and FIG. 9c.

The casing 12 is accepted by the internal volume of the RJ-45 port 41 and shows how those portions of the casing sides 12b, 12c, 12e and 12f located internal to the interior of the USB port are well supported by the internal sides of the RJ-45 port.

In this embodiment, aperture 13b is provided in the rear side 12d of the casing 12 allowing for the use of a micro port 39, which could be used to provide power and security control signals to a printed circuit board 40 (see FIG. 14b) from an external source.

The locking plate 10 is illustrated in the locked condition with the locking plate 10 extending through aperture 13a into the recess just inside the RJ-45 port 41 opening.

In this embodiment, electrical pins 8a, 8b are directly attached to printed circuit board 40 (see FIG. 14b) which could be used to provide DC voltage to the primary wire 1.

FIG. 14b illustrates a side, cut-away view of the mechanical locking device 102 and how it could be physically configured in a RJ-45 port security device as described in FIG. 14a.

FIG. 15a illustrates a top, cut-away view of a serial port security device which contains the mechanical locking device 103 according to an exemplary embodiment of the present invention. In FIG. 15a, the port security device illustrated could be used as a serial port locking device. In this application, the mechanical locking device 103 ensures the serial port security device cannot be physically removed from the serial port 50 until the mechanical locking device 103 is unlocked. The functions and purposes of the mechanical locking device 103 and all associated sub-components including the primary wire 1, axle 2, support plates 4a, 4b, insulating coupling 5, upper attachment pin 6, electrical pins 8a, 8b, locking plate 10, casing 14, spring attachment pin 16, coil spring 17, spring anchor tab 18, secondary wire 19, base lug 20 and secondary attachment pin 21 are as previously described in relation to FIG. 10a, FIG. 10b and FIG. 10c.

Male threaded pins 51a, 51b, containing attached drive nuts 52a, 52b, are screwed into the serial port 50 and extend into the internal volume of the casing 14 on two sides. The serial port security device contains machined cylinders 55a, 55b which are supported internally by the casing 14 that slide over the threaded pins 51a, 51b when the security device is manually installed, to provide the necessary strength and rigidity to the casing 14 and all internal components. The locking plate 10 engages the locking bar 53 just as the casing surface 14a mates with the rear edge of the serial port 50 to form a tight fit such that no gaps exist between the casing 14 and the serial port 50.

In this embodiment, aperture 15 is provided in the rear side 14d of the casing 14 allowing for the use of a micro port 39, which could be used to provide power and security control signals to a printed circuit board 40 (see FIG. 15b) from an external source.

In this embodiment, electrical pins 8a, 8b are directly attached to printed circuit board 40 (see FIG. 15b) which could be used to provide DC voltage to the primary wire 1.

FIG. 15b illustrates a side, cut-away view of the mechanical locking device 103 and how it could be physically configured in a serial port security device as described in FIG. 15a.

FIG. 16a illustrates a top, cut-away view of a locking portable storage device, and in particular a locking flash drive, for a USB port 30 which contains the mechanical locking device 104 according to an exemplary embodiment of the present invention. In this application, the mechanical locking device 104 ensures the locking flash drive cannot be physically removed from the USB port 30 until the mechanical locking device 104 is unlocked. The functions and purposes of the mechanical locking device 104 and all associated sub-components including the primary wire 1, axle 2, locking arms 3a, 3b, support plates 4a, 4b, insulating coupling 5, upper attachment pin 6, electrical pins 8a, 8b, locking plate 9, locking tabs 9a, 9b, casing 62, spring attachment pin 16, coil spring 17, spring anchor tab 18, secondary wire 19, base lug 20 and secondary attachment pin 21 are as previously described in relation to FIG. 11a, FIG. 11b and FIG. 11c.

In this embodiment, locking arms 3a, 3b are illustrated with the locking arms 3a, 3b engaged in the USB port 30 lower shield tab holes 31a, 31b; however, use of a locking plate 9 and locking tabs 9a, 9b as illustrated in FIG. 8a would function similarly.

The casing 62 is accepted by the internal volume of the USB port 30 and shows how those portions of the casing sides 62b, 62c, 62e and 62f located internal to the interior of the USB port 30 are well supported by the internal sides of the USB port 30.

In this embodiment, aperture 63 is provided in the rearward side 62d of the casing 62 allowing for the use of a micro-port 39, which could be used to provide power and security control signals to a printed circuit board 40 (see FIG. 16b) from an external source.

In this embodiment, a USB cable connector 34, which makes electrical contact with the contact strips 33 of the USB port connector internal to the USB port 30, is shown. The USB cable connector 34 can then provide power and security control signals to the printed circuit board 40 (see FIG. 16b) from the host device via control cable 32.

In this embodiment, electrical pins 8a, 8b are directly attached to the printed circuit board 40 (see FIG. 16b) to provide a source of DC voltage to the primary wire 1.

Memory card 64 and memory controller card 65 are shown for illustrative purposes and represent the typical configuration of these cards in flash drives which are currently available.

FIG. 16b illustrates a side, cut-away view of the mechanical locking device 104 and how it could be physically configured in a USB locking portable storage device, and in particular a USB locking flash drive as described in FIG. 16a.

What is claimed is:

1. A mechanical locking device for a computer Input/Output (I/O) port, comprising:
   a casing configured for mechanical insertion of a secure member into the computer I/O port to physically block the computer I/O port;
   a securing mechanical locking mechanism disposed within the casing, the securing mechanical locking mechanism comprising:
   a locking element configured to engage the computer I/O port in a locked condition and to disengage from the computer I/O port in an unlocked condition; and
   a flex actuator wire of shape memory configured to cause the locking element to move between the locked condition and the unlocked condition, and
   wherein upon receiving authentication credentials from an external computing device, a first flex actuator wire of shape memory causes the locking element to move from the locked condition to the unlocked condition in response to a successful validation of the authentication credentials and a thermally activated second actuator prevents the locking element from moving to the unlocked condition due to the application of external heat by having a lower thermal activation temperature and a higher activation force from a shape memory wire of the second actuator than from the first flex actuator wire of shape memory.

2. The mechanical locking device of claim 1, wherein the casing comprises:
   an open side proximate the computer I/O port with the casing configured to be received within the computer I/O port such that no gaps exist between the casing and the computer I/O port when the casing is fully inserted into the computer I/O port.

3. The mechanical locking device of claim 1, wherein the casing comprises:
   a contiguous shell which physically contains the mechanical locking mechanism and is made from a material having a low thermal conductivity relative to the first actuator and the second actuator.

4. The mechanical locking device of claim 1, wherein the casing comprises:
   one or more apertures configured to allow one or more electrical power and/or communication signal conductors to be routed to one or more electronic components disposed within the casing from an external device.

5. The mechanical locking device of claim 1, wherein the casing comprises:
   one or more apertures for the locking element that are inaccessible when the casing is fully inserted into the computer I/O port; and
   at least one aperture external to the computer I/O port that is configured such that insertion of an external object into the internal volume of the casing prevents physical contact of the external object with the locking element.

6. The mechanical locking device of claim 1, wherein the locking mechanism further comprises:
   an axle supported on the casing by two support plates which allow the axle to rotate between the locked condition and the unlocked condition, the axle being coupled to the locking element, wherein rotation of the axle causes the locking element to move between the locked condition and the unlocked condition; and
   a spring connected between a spring attachment pin on the axle and a spring anchor tab supported on the casing to produce a constant bias on the axle in an engaged direction.

7. The mechanical locking device of claim 6, wherein the first actuator comprises:
   an upper attachment pin connected to the axle; and
   a primary shape memory wire having a pair of free ends and connected at each free end to an electrical pin wherein the primary shape memory wire is operably coupled to the upper attachment pin such that when a DC voltage is applied between the electrical pins, the primary shape memory wire contracts, causing the axle to rotate in a disengaged direction.

8. The mechanical locking device of claim 7, wherein the second actuator comprises:
   a secondary shape memory wire having a lower thermal activation temperature and a higher activation force than the primary shape memory wire; and
   a secondary attachment pin on the axle and a base lug supported on the casing between which is attached the secondary shape memory wire;
   wherein application of external heat to the casing causes the secondary shape memory wire to contract, thereby preventing the axle from moving to the unlocked condition.

9. The mechanical locking device of claim 7, wherein the upper attachment pin is located on an upper side of the axle and is attached to an insulating coupling that is made from a low melting point metal alloy.

10. The mechanical locking device of claim 1, wherein the locking element comprises at least one of a pair of locking arms and a locking plate made from a nonmagnetic material.

11. The mechanical locking device of claim 1, wherein the locking element comprises at least one of a pair of locking arms and a locking plate made of a non-metallic material.

12. The mechanical locking device of claim 1 configured to be used to secure a USB port when the USB port is not in use by a host device.

13. The mechanical locking device of claim 12 configured to be used to monitor a USB port when the USB port is in use by the host device.

14. The mechanical locking device of claim 1 configured to be used to secure an RJ-45 port when the RJ-45 port is not in use by a host device.

15. The mechanical locking device of claim 1 configured to be used to secure a serial port when the serial port is not in use by a host device.

16. The mechanical locking device of claim 1 configured to secure a locking portable flash drive to a USB computer port.

17. A mechanical locking device for securing a computer Input/Output (I/O) port, comprising:
   a casing;
   a locking mechanism configured to engage the computer I/O port in a locked condition and to disengage from the computer I/O port in an unlocked condition;
   the locking mechanism disposed within the casing, the locking mechanism comprising at least one locking element operable for movement between the locked condition and the unlocked condition, wherein upon receiving authentication credentials from an external computing device, a flex actuator wire of shape memory causes the at least one locking element to move from the locked condition to the unlocked condition in response to a successful validation of the authentication credentials;

a primary shape memory wire that is thermally activated to contract and thereby move the locking element between the locked condition and the unlocked condition; and a secondary shape memory wire having a lower thermal activation temperature and a higher activation force than the primary shape memory wire, the secondary shape memory wire being operable for preventing the locking element from moving to the unlocked condition due to the application of external heat.

18. The mechanical locking device of claim 17, wherein the locking element comprises a locking plate having a pair of locking tabs operably coupled to an axle configured for rotation about a rotational axis of the axle.

19. The mechanical locking device of claim 17, wherein the locking element comprises a locking plate operably coupled to an axle configured for rotation about a rotational axis of the axle.

20. The mechanical locking device of claim 17, further comprising an electrical activation circuit operable for activating the primary shape memory wire to move the locking element between the locked condition and the unlocked condition.

\* \* \* \* \*